United States Patent
Kamiya et al.

(10) Patent No.: US 6,625,143 B1
(45) Date of Patent: Sep. 23, 2003

(54) SWITCH HAVING VIRTUAL ACCESS NETWORK CAPABILITY AND SWITCHING SYSTEM THEREOF

(75) Inventors: Kenshi Kamiya, Kanagawa (JP); Mamoru Higuchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/984,257

(22) Filed: Dec. 3, 1997

(30) Foreign Application Priority Data

Jun. 18, 1997 (JP) ............................................... 9-160794

(51) Int. Cl.[7] ......................... H04L 12/50; H04L 12/66; H04M 1/56
(52) U.S. Cl. ........................ 370/360; 370/463; 379/142
(58) Field of Search ................................ 370/360, 410, 370/522, 524, 420, 463; 379/142

(56) References Cited

U.S. PATENT DOCUMENTS

| | | | | |
|---|---|---|---|---|
| 5,333,183 A | * | 7/1994 | Herbert | 379/112 |
| 5,521,924 A | * | 5/1996 | Kakama et al. | 370/94.2 |
| 5,600,640 A | * | 2/1997 | Blair et al. | 370/360 |
| 5,781,623 A | * | 7/1998 | Khakzar | 379/230 |
| 5,828,746 A | * | 10/1998 | Ardon | 379/230 |
| 5,896,371 A | * | 4/1999 | Kobayashi et al. | 370/232 |
| 5,910,980 A | * | 6/1999 | Ogasawara et al. | 379/142 |
| 5,924,016 A | * | 7/1999 | Fuller et al. | 455/31.1 |
| 6,215,858 B1 | * | 4/2001 | Bartholomew et al. | 379/88.17 |
| 6,381,327 B1 | * | 4/2002 | Loebig | 379/221.03 |

FOREIGN PATENT DOCUMENTS

DE        0451693 A2  *  4/1991

* cited by examiner

Primary Examiner—Alpus H. Hsu
Assistant Examiner—Toan D. Nguyen
(74) Attorney, Agent, or Firm—Katten Muchin Zavis Rosenman

(57) ABSTRACT

A virtual AN switch comprises a virtual AN unit. The virtual AN unit is implemented by virtually building the same capability as that of a normal access network device into a virtual AN switch, and is connected to a control switch via a V5.2 interface. Whether or not a subscriber accommodated by the virtual AN switch is accommodated in the virtual AN unit is registered to a subscriber data memory for each subscriber. The virtual AN unit performs a conversion between an intra-office signal and a V5.2 signal message. For the subscriber accommodated by the virtual AN unit, the virtual AN switch serves as a remote accommodating device of the control switch.

14 Claims, 32 Drawing Sheets

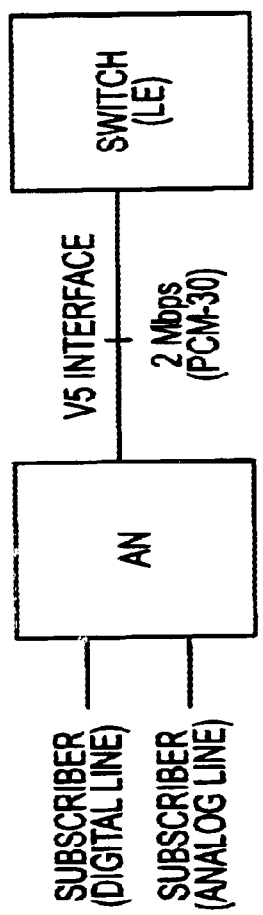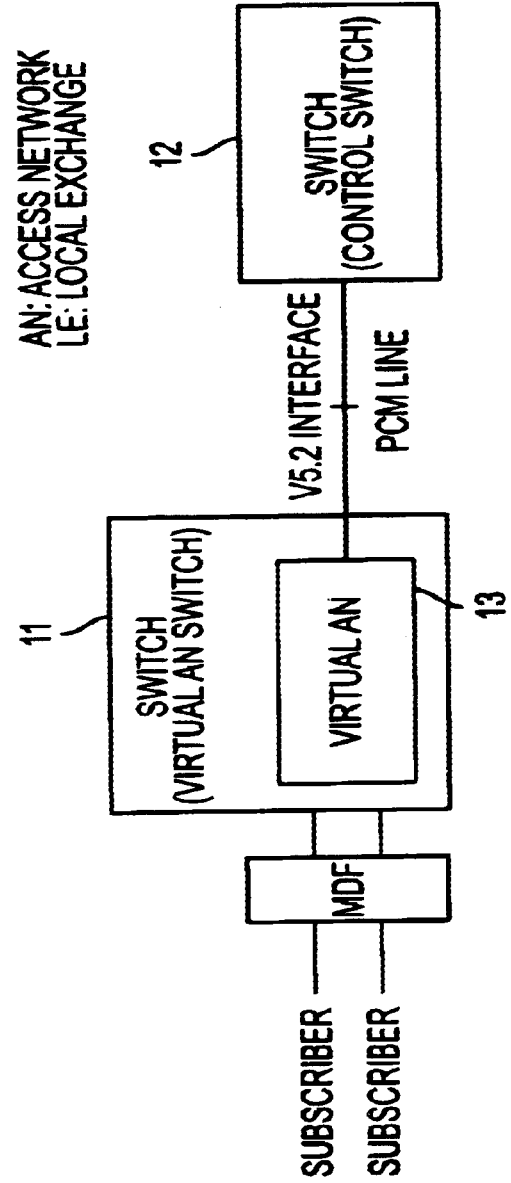

| LAYER 3 PROTOCOL | | MESSAGE | USAGE |
|---|---|---|---|
| SIGNALLING | | ESTABLISH | REQUEST ORIGINATING OR TERMINATING PATH |
| | | ESTABLISH ACK | ACKNOWLEDGE ESTABLISH |
| | | SIGNAL | CONVEY PSTN LINE CONDITIONS |
| | | SIGNAL ACK | ACKNOWLEDGE SIGNAL |
| | | STATUS | INDICATE THE STATUS OF AN |
| | | STATUS INQUIRY | REQUEST THE STATUS OF AN |
| | | DISCONNECT | INDICATE TO RELEASE THE PATH |
| | | DISCONNECT COMPLETE | ACKNOWLEDGE DISCONNECT |
| | | PROTOCOL PARAMETER | CHANGE A PROTOCOL PARAMETER IN AN "NOT SUPPORTED BY FETEX-150 |
| CONTROL | PORT | PORT CONTROL | CONVEY ISDN/PSTN USER PORT CONTROL- FUNCTION-ELEMENT INFORMATION ELEMENT |
| | | PORT CONTROL ACK | ACKNOWLEDGE PORT CONTROL |
| | COMMON | COMMON CONTROL | CONVEY INFORMATION OF INTERFACE CONTROL |
| | | COMMON CONTROL ACK | ACKNOWLEDGE COMMON CONTROL |

FIG. 5

| LAYER 3 PROTOCOL | | MESSAGE | | USAGE |
|---|---|---|---|---|
| LINK CONTROL | | LINK CONTROL | BOTH | CONVEY INFORMATION OF LINK CONTROL |
| | | LINK CONTROL ACK | BOTH | ACKNOWLEDGE LINK CONTROL |
| | BCC | ALLOCATION | LE→AN | REQUEST THE ALLOCATION OF BEARER CHANNEL |
| | | ALLOCATION COMPLETE | AN→LE | INDICATE TO COMPLETE THE ALLOCATION |
| | | ALLOCATION REJECT | AN→LE | INDICATE TO REJECT THE ALLOCATION |
| | | DEALLOCATION | LE→AN | REQUEST THE DE-ALLOCATION OF BEARER CHANNEL |
| | | DEALLOCATION COMPLETE | AN→LE | INDICATE TO COMPLETE THE DE-ALLOCATION |
| | | DEALLOCATION REJECT | AN→LE | INDICATE TO REJECT THE ALLOCATION |
| | | AUDIT | LE→AN | REQUEST THE COMPLETE INFORMATION OF BEARER CHANNEL CONNECTION |
| | | AUDIT COMPLETE | AN→LE | INDICATE THE RESULT OF AUDIT REQUEST |
| | | AN FAULT | AN→LE | NOTIFY THE FAULT OF BEARER CHANNEL CONNECTION |
| | | AN FAULT ACKNOWLEDGE | LE→AN | ACKNOWLEDGE AN FAULT |
| | | PROTOCOL ERROR | AN→LE | INDICATE PROTOCOL ERROR |
| | PROTECTION | SWITCH-OVER REQ | AN→LE | REQUEST A SWITCH-OVER OF COMMUNICATION CHANNEL |
| | | SWITCH-OVER COM | LE→AN | INDICATE A SWITCH-OVER OF COMMUNICATION CHANNEL |
| | | OS-SWITCH-OVER COM | LE→AN | INDICATE A SWITCH-OVER OF COMMUNICATION CHANNEL ON REQUEST OF OPERATOR |
| | | SWITCH-OVER ACK | AN→LE | ACKNOWLEDGE SWITCH-OVER REQ |
| | | SWITCH-OVER REJECT | BOTH | INDICATE TO REJECT SWITCH-OVER REQ |
| | | PROTOCOL ERROR | AN→LE | INDICATE PROTOCOL ERROR |
| | | RESET SN COM | BOTH | REQUEST TO SET TO ZERO FOR ALL STATE VARIABLES |
| | | RESET SN ACK | BOTH | ACKNOWLEDGE RESET SN COM |

FIG. 6

| USER PORT ID | NORMAL SEARCH KEY |
|---|---|
| 20 | 000a |
| 21 | 000d |
| ⋮ | ⋮ |

FIG. 16A

| INTRA-OFFICE SIGNAL (INPUT) | | V5.2 SIGNAL (OUTPUT) | |
|---|---|---|---|
| MESSAGE | PARAMETER | MESSAGE | PARAMETER |
| OFF-HOOK | SUBSCRIBER ACCOMMODATION POSITION (PHYSICAL ACCOMMODATION POSITION) | ESTABLISH | L3 ADDRESS (USER PORT ID) |
| DIGIT INFO | SUBSCRIBER ACCOMMODATION POSITION, RECEIVED DIGIT | SIGNAL | L3 ADDRESS, RECEIVED DIGIT |
| ANSWER | SUBSCRIBER ACCOMMODATION POSITION | SIGNAL | L3 ADDRESS, STEADY SIGNAL |

FIG. 16B

| V5.2 SIGNAL (INPUT) | | INTRA-OFFICE SIGNAL (OUTPUT) | |
|---|---|---|---|
| MESSAGE | PARAMETER | MESSAGE | PARAMETER |
| ESTABLISH | L3 ADDRESS, CADENCED RINGING TYPE | RINGING | SUBSCRIBER ACCOMMODATION POSITION, RINGING TYPE |
| ESTABLISH ACK | L3 ADDRESS | DIGIT RECEIVING | SUBSCRIBER ACCOMMODATION POSITION |
| ALLOCATION | L3 ADDRESS | PATH CONNECT | SUBSCRIBER ACCOMMODATION POSITION |
| SIGNAL | L3 ADDRESS | PATH CONNECT | SUBSCRIBER ACCOMMODATION POSITION |

SWITCH HAVING VIRTUAL ACCESS NETWORK CAPABILITY AND SWITCHING SYSTEM THEREOF

BACKGROUND OF THE INVENTION

1. Field of the Invention

The present invention relates to a switch structuring a network, and more particularly to an electronic switch.

2. Description the Related Art

Most switches arranged in a network are electronic switches these days. A software program describing capabilities required for a switch is installed in an electronic switch, and a switching process is implemented by executing this program. Depending on the description of the program, the electronic switch not only interconnects subscribers, but also can provide various additional services such as a three-party call, a call transfer, a centrex service, etc. As an example, the centrex service (Centralized Extension Service) is briefly explained below.

The centrex service is a service with which a station switch (a switch operated by a common carrier) is used as a PBX (Private Branch Exchange). Assuming that subscribers A and B enroll in the centrex service, the numbering system or the charge for the communications between the subscribers A and B is processed as those of an extension call. That is, once the extension numbers of these subscribers are registered to the switch beforehand, the switch recognizes that the extension number is the number assigned to the subscriber B, and connects the subscriber A to the subscriber B when the subscriber A dials the extension number of the subscriber B. At this time, the switch does not charge for this communication.

To implement the above described centrex service, the program describing a process for determining whether or not a calling party and a called party are enrolled in the centrex service, a process for converting an extension number into a number used in a normal communication, a process for preventing a charging counter from incrementing its value if a communication is the centrex communication, etc. the data required for the centrex service, etc. may be stored in the switch.

In this way, the electronic switch can provide various services (including additional services) depending on a program to be installed, etc.

As described above, a service provided by an electronic switch (simply referred to as a switch hereinafter) which structures a network is controlled by a program installed in each switch (switching node). That is, a physical node accommodating a subscriber and a node implementing a service is the same.

However, if a plurality of types of switches exist in a network, the types of services to be supported may differ depending on the types of switches. For example, one switch provides a three-party call service and a call transfer service other than the centrex service, while another switch provides all of the three services.

Accordingly, if a certain subscriber desires a service which cannot be provided by the switch currently accommodating the subscriber, the subscriber and the switch providing the desired service must be connected. Namely, the connection of the subscriber line must be changed. If these two switches are accommodated in an identical station building (for accommodating switches), the connection of the subscriber line can be changed by changing the connection in an MDF (Main Distribution Frame). However, if the switch providing the service that the subscriber desires is arranged in a different station, it is substantially impossible to change the accommodation of the subscriber line. This means that the subscriber cannot receive his or her desired service.

Furthermore, there is the demand for making subscribers accommodated by different switches belong to an identical centrex group. Such a system is generally called a City-Wide centrex service. The City-Wide centrex service is currently implemented with one of the following methods.

(1) Using the capability of an IN (Intelligent Network). With this method, the City-Wide centrex service can be provided to an arbitrary subscriber, but some restriction may be imposed on services which can be provided due to the restrictions of the IN signalling method.

(2) Arranging a switch dedicated to the centrex service. With this method, the switch dedicated to the centrex service must be arranged, and also a remote concentrator for connecting a subscriber to the switch dedicated to the centrex service must be arranged in each station building accommodating other switches. The subscriber who is to receive the centrex service is accommodated in a remote concentrator in the nearest station building, so that the subscriber is connected to the switch dedicated to the centrex service. With such a configuration, the subscribers accommodated by different station buildings are recognized to belong to the identical centrex group, and can receive services without any restrictions. With this method, however, a switch for accommodating a normal subscriber and a remote concentrator for connecting the centrex subscriber to the switch dedicated to the centrex service must be arranged together. Therefore, the equipment efficiency deteriorates, the equipment cost becomes expensive, etc.

Additionally, if a normal switch enters into an overload state, its load is reduced by restricting call origination or call termination (especially restricting the call origination). Accordingly, the quality of a service to be provided by a switch degrades, a call is difficult to be established during the restriction, etc.

SUMMARY OF THE INVENTION

An object of the present invention is to improve the quality of a communication service. More specifically, the object of the present invention is to allow a subscriber to receive his or her desired service provided by a switch which does not physically accommodate the subscriber without changing the connection of a subscriber line.

A switch according to the present invention assumes a first switch arranged in a network where a plurality of switches including the first and second switches are interconnected. The switch according to the present invention comprises a virtual access network device for making the second switch perform the process of a communication related to a subscriber accommodated by the first switch; a storing unit for storing attribute information indicating whether or not the subscriber accommodated by the first switch uses the virtual access network device; and a subscriber accommodating unit for accommodating an arbitrary subscriber among subscribers accommodated by the first switch in the virtual access network device based on the attribute information stored in the storing unit.

With this configuration, only a registered subscriber is accommodated in the virtual access network device. If one subscriber is accommodated in the virtual access network device, the process of the communication related to that subscriber is performed by the second switch. That is, the subscriber accommodated by the virtual access network device is accommodated in the first switch physically, but it is accommodated in the second switch substantially. Therefore, this subscriber can receive a service provided by the second switch.

A switching system according to the present invention assumes the configuration where a plurality of switches including the first and second switches are interconnected. The first switch comprises a virtual access network device for making the second switch perform the process of a communication related to a subscriber accommodated by the first switch; a storing unit for storing attribute information indicating whether or not the subscriber accommodated by the first switch uses the virtual access network device; and a subscriber accommodating unit for accommodating an arbitrary subscriber among subscribers accommodated by the first switch in the virtual access network device based on the attribute information stored in the storing unit. The second switch controls the communications related to subscribers accommodated by the virtual access network device.

BRIEF DESCRIPTION OF THE DRAWINGS

FIG. 2A is a block diagram showing the basic configuration of an access network;

FIG. 2B is a block diagram showing the basic configuration of the present invention;

FIG. 5 shows a list of V5.2 signal messages (No.1);

FIG. 6 shows a list of V5.2 signal messages (No.2);

FIGS. 16A and 16B exemplify the implementations of a signal conversion table;

DETAILED DESCRIPTION OF THE INVENTION

Figure 1:
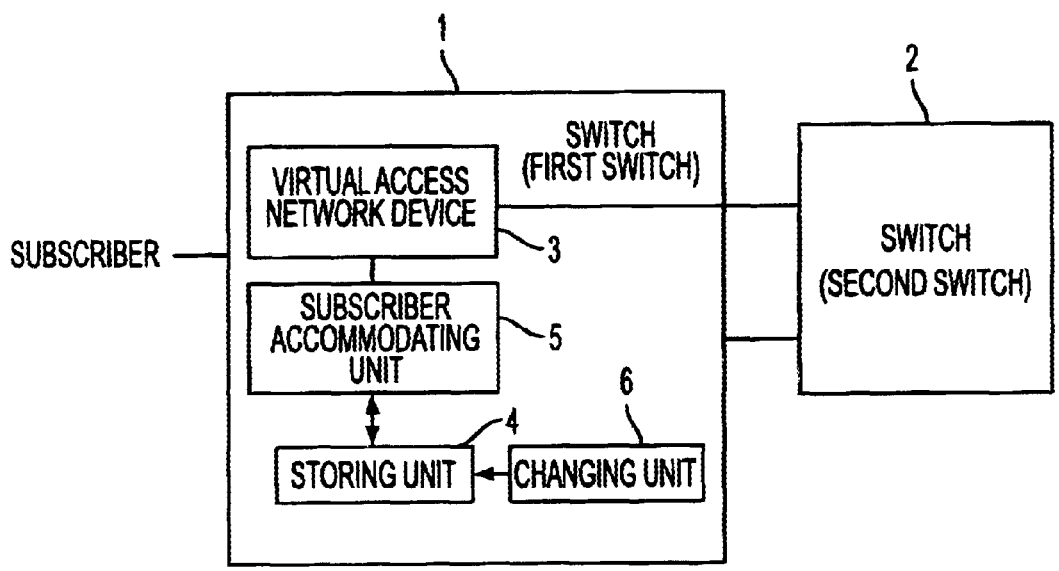
FIG. 1 is a block diagram explaining the principle of the present invention.

Units according to the present invention are explained below by referring to the block diagram showing the principle in FIG. 1. A switch 1 (first switch) is connected to a switch 2 (second switch). A virtual access network device 3 makes the switch 2 perform a process of a communication related to a subscriber accommodated by the switch 1. The virtual access network device 3 can be implemented, for example, as a capability obtained by executing a software program. A storing unit 4 stores attribute information indicating whether or not each subscriber accommodated by the switch 1 uses the virtual access network device 3. A subscriber accommodating unit 5 accommodates an arbitrary subscriber among subscribers accommodated by the switch 1 by the virtual access network device 3 based on the attribute information stored in the storing unit 4.

A normal subscriber is not accommodated by the virtual access network device 3. If a certain subscriber is accommodated by the virtual access network device 3, the process of a communication related to that subscriber is performed by the switch 2. That is, the subscriber accommodated by the virtual access network device 3 is physically accommodated by the switch 1, but is substantially accommodated by the switch 2. Accordingly, the subscriber can receive services provided by the second switch.

Whether or not to accommodate the subscriber accommodated by the switch 1 by the virtual access network device 3 can be specified for each subscriber according to the attribute information stored in the storing unit 4. This attribute information can be changed by a changing unit 6 for each subscriber. With such a configuration, the subscriber who is physically accommodated by the switch 1 can be substantially accommodated by the switch 2 without changing the connection of a subscriber line.

An access network (hereinafter abbreviated to "AN") is a technique for remotely accommodating a subscriber at a point distant from a switch. The AN is arranged, for example, in one building or in a particular region, and accommodates a plurality of subscribers as shown in FIG. 2A. The AN and the switch arranged in the network are connected via a predetermined interface, so that the subscriber is remotely accommodated by the network. As the interface/communications protocols between the AN and the switch, there is the standard named "V5". The V5 interface is the standard laid down by the ITU-T (International Telecommunication Union—Telecommunication Standardization Sector) and the ETSI (European Telecommunications Standards Institute). Currently, V5.1 and V5.2 are standardized. The embodiment to be described below adopts the configuration using V5.2. However, the present invention may use V5.1.

The AN is originally one independent device connected to a switch. With the switching system according to the present invention, however, the AN capability is arranged in a switch in a pseudo manner as shown in FIG. 2B. The AN capability arranged in the switch is hereinafter referred to as a "virtual AN".

The virtual AN is a capability arranged in a switch, and provides the capability for transmitting a signal from a subscriber to another switch via the V5.2 interface, the capability for multiplexing communication lines etc. in a similar manner as in an existing AN. Additionally, the virtual AN does not perform a call process. The switch including the virtual AN is hereinafter referred to as a "virtual AN switch", while the switch accommodating the virtual AN by using the V5.2 interface is referred to as a "control switch".

A virtual AN switch 11 and a control switch 12 are connected via a normal PCM digital line. A virtual AN 13 is accommodated in the control switch 12 via the PCM digital line. A subscriber accommodated by the virtual AN switch 11 can receive a service provided by the control switch 12 by using the virtual AN 13 as if the subscriber were accommodated by the control switch 12, although the subscriber is physically accommodated by the virtual AN switch 11. That is, the use of the virtual AN 13 allows a switch which physically accommodates a subscriber to change to a switch which actually implements a service, without changing the connection of a subscriber line on an MDF for connecting a subscriber line to a switch or an accommodation position in a subscriber stage device.

In this embodiment, a service includes not only a process for setting a path in order to connect a call, but also a process for providing additional services such as a call transfer service, callback service, three-party call service, etc.

If the control switch 12 is equipped with the V5.2 interface conforming to the standard, it can control a subscriber using the virtual AN 13 (hereinafter referred to as a virtual AN subscriber) similar to a subscriber accommodated by a normal AN. That is, the control switch 12 can handle the subscriber who is physically accommodated by the other switch (virtual AN switch 11) as if the control switch 12 itself accommodates the subscriber, and can provide its service to the subscriber accommodated by the other switch.

Figure 3:
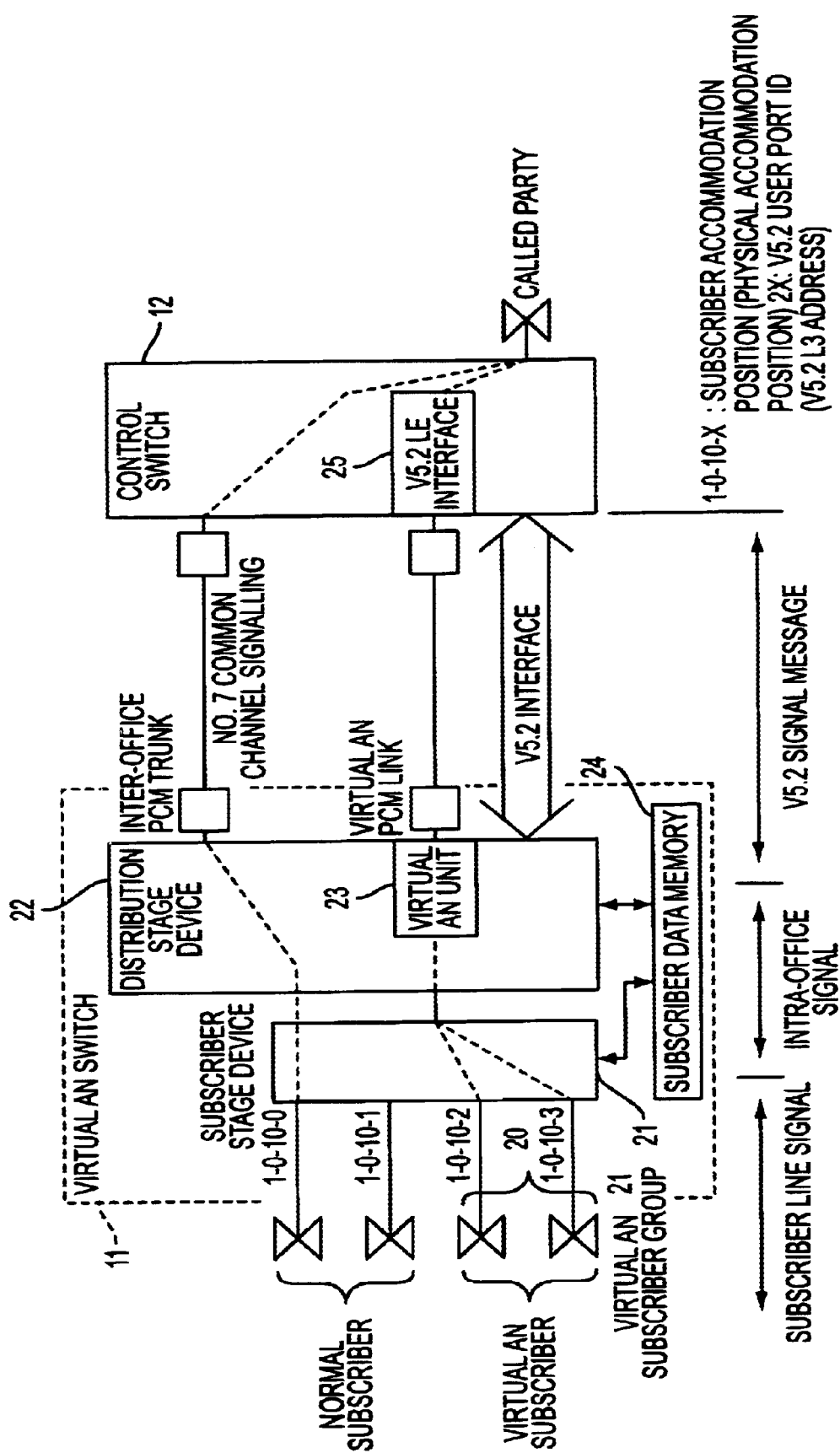
FIG. 3 is a schematic diagram showing a switching system according to an embodiment.

FIG. 3 is a schematic diagram showing the configuration of the switching system according to this embodiment. The virtual AN switch 11 comprises a subscriber stage device 21 and a distribution stage device 22. The subscriber stage device 21 is connected with a subscriber line accommodated in the virtual AN switch 11. The subscriber stage device 21 identifies each subscriber line (or each subscriber) as subscriber accommodation position information (physical accommodation position information). The subscriber accommodation position is represented, for example, by a combination of a device number to which each subscriber line is connected, a board number (e.g. card slot number) arranged in the device, a circuit number on the board, etc. in the subscriber stage device 21. In the example shown in FIG. 3, 1-0–10-0–1-0–10-3 are the subscriber accommodation position numbers.

The distribution stage device 22 is connected to one or more other switches via PCM digital lines. The distribution stage device 22 comprises a virtual AN unit 23. The virtual AN unit 23 provides the capability for transmitting a signal from a subscriber to another switch (control switch 12) via a V5.2 interface, and the capability for multiplexing communication lines (the virtual AN unit 23 and the subscriber stage device 21 share and implement the multiplex capability). The distribution stage device 22 transmits/receives a control signal between another switch and the device itself with a No.7 common channel signalling for a call related to a normal subscriber. It uses the virtual AN unit 23 for a call related to a virtual AN subscriber, and transmits/receives a V5.2 signal message between the control switch 12 and the device itself.

The control switch 12 has an interface unit 25 for transmitting/receiving a V5.2 signal message as an LE stipulated for V5.2. The interface unit 25 is the same as an interface accommodating an existing AN (the interface transmitting/receiving the V5.2 signal message between the existing AN and the existing LE).

The virtual AN switch 11 can accommodate an arbitrary subscriber among subscribers that the virtual AN switch 11 itself accommodates in the virtual AN unit 23. That is, when a certain subscriber uses the virtual AN capability, the information that the subscriber uses the virtual AN capability is set in a subscriber data memory 24 arranged in the virtual switch 11 in accordance with the contract between the subscriber and a common carrier. As a result, the subscriber is discriminated from a normal subscriber, and can use the virtual AN unit 23. In the example shown in FIG. 3, the subscribers respectively having the subscriber accommodation position information 1-0–10-2 and 1-0–10-3 are virtual AN subscribers accommodated by the virtual AN unit 23.

Since a virtual AN subscriber uses the V5.2 interface, a V5.2 user port ID (a layer 3 address of V5.2) must be assigned. The V5.2 user port ID is assigned, for example, when a subscriber contracts with a common carrier. In the example shown in FIG. 3, "20" is assigned to the subscriber having the physical accommodation position information "1-0–10-2" as the V5.2 user port ID. These position and ID information are registered to the subscriber data memory 24 for each subscriber.

By making the information registration to the subscriber data memory 24 for each subscriber as described above, an arbitrary subscriber accommodated by the virtual AN switch 11 is separated and discriminated from a normal subscriber, and can be defined as the virtual AN subscriber accommodated by the virtual AN unit 23.

A plurality of virtual AN units can be arranged in the virtual AN switch 11. The virtual AN switch 11 handles an aggregate of virtual AN subscribers accommodated by each virtual AN unit as one virtual AN subscriber group. That is, the virtual AN switch 11 can accommodate a plurality of virtual AN subscriber groups.

The virtual AN switch 11 allocates necessary resources such as a PCM link device for a virtual AN, a V5.2 signal link, and an AN number, etc. to each virtual AN unit (each virtual AN subscriber group) in order to equip each virtual AN unit with the capability of an AN conforming to the ITU-T and ETSI standards.

Figure 4:
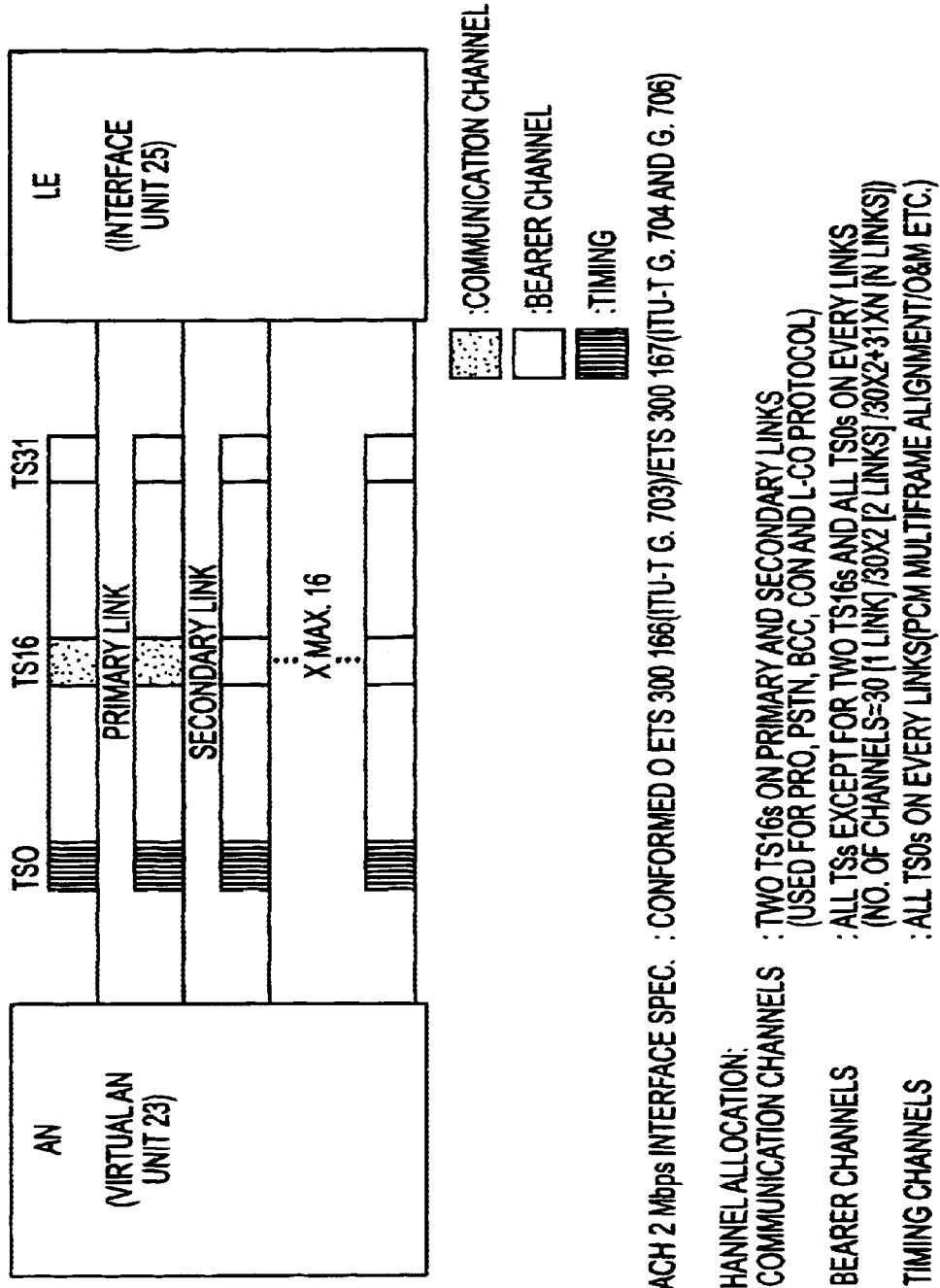
FIG. 4 is a schematic diagram showing a PCM link between an AN and an LE.

FIG. 4 is a schematic diagram showing a PCM link between an AN and an LE. The AN and the LE respectively correspond to the virtual AN unit 23 and the interface unit 25 arranged in the control switch 12, which are shown in FIG. 3. Up to 16 PCM links are established between the virtual AN unit 23 and the interface unit 25. A V5.2 signal message is stored in each communication channel (TS16) on the two links called the primary and secondary links, and transmitted/received. Here, the information for identifying these links are defined as signal link numbers.

Turning back to FIG. 3, the operations of the virtual AN switch 11 are explained below. A signal from each subscriber (events such as an off-hook operation, dial operation, etc. in this case) is converted into an intra-office signal in the subscriber stage device 21. The intra-office signal is a message used within a switch. The intra-office signal is, generally, defined in the format unique to each switch vendor. The following process may differ depending on whether a calling party is either a normal subscriber or a virtual AN subscriber.

If the calling party is a normal subscriber, the virtual AN switch 11 performs a normal call process. That is, the call is connected via the following path:

the calling party (normal subscriber)—the calling switch (virtual AN switch 11)—the inter-office PCM trunk (inter-office signal such as a No.7 common channel signalling, etc.)—the called switch (control switch 12)—the called party. In this case, the switch processing the call as a service implementation point is the switch accommodating the calling party, that is, the virtual AN switch 11.

If the calling party is a virtual AN subscriber, the signal from the calling party is converted into an intra-office signal, and further converted into a V5.2 signal message in the virtual AN unit 23. Namely, if the subscriber is accommodated in the virtual AN unit 23, the virtual AN switch 11 does not control the service (including the call process), and performs the conversion between the event signal from the subscriber and the V5.2 signal message.

The V5.2 signal message is transmitted to the control switch 12 via the PCM link arranged for the virtual AN, and the service is controlled in the control switch 12, similar to the subscriber accommodated by a normal AN. In this case, the call is connected via the following path: the calling party (virtual AN subscriber)—the virtual AN unit 23—the PCM link for the virtual AN (V5.2 interface)—the interface unit 25 for the control switch 12—the called party. The switch processing the call as a service implementation point is the control switch 12. That is, the virtual AN subscriber is physically connected to the virtual AN switch 11, but its service is implemented in the control switch 12.

As described above, whether the subscriber accommodated by the virtual AN switch 11 is handled as either a normal subscriber or a virtual AN subscriber can be specified depending on the data stored in the subscriber data memory 24. Accordingly, the switch implementing a service can be easily changed without changing the connection of a subscriber line by changing the data stored in the subscriber data memory 24.

When a subscriber is registered as a virtual AN subscriber, any of the semi-permanent accommodating method, the per-call-accommodating method, and the dynamic load sharing method can be selected. With the semi-permanent accommodating method, a subscriber is semi-permanently accommodated in a virtual AN, and a virtual AN process is performed for all calls related to the subscriber. With the per-call-accommodating method, it is determined whether or not the virtual AN process is performed for each call depending on the type of a service requested by the subscriber. With the dynamic load sharing method, the subscriber is dynamically changed from normal subscriber accommodation to virtual AN subscriber accommodation depending on need, according to the conditions such as the load condition of a call processing processor of the virtual AN switch accommodating the subscriber. The details of these three accommodating methods will be described later.

For ease of understanding of the switching system according to this embodiment, the V5.2 interface is briefly explained below although it is a known technique.

FIGS. 5 and 6 show lists of V5.2 signal messages. With the switching system according to this embodiment, these messages are transmitted/received between the virtual AN unit 23 and the interface unit 25 of the control switch 12, which are shown in FIG. 3. The virtual AN unit 23, which will be described later in detail, performs the conversion between these V5.2 signal messages and intra-office signals.

Figure 7:
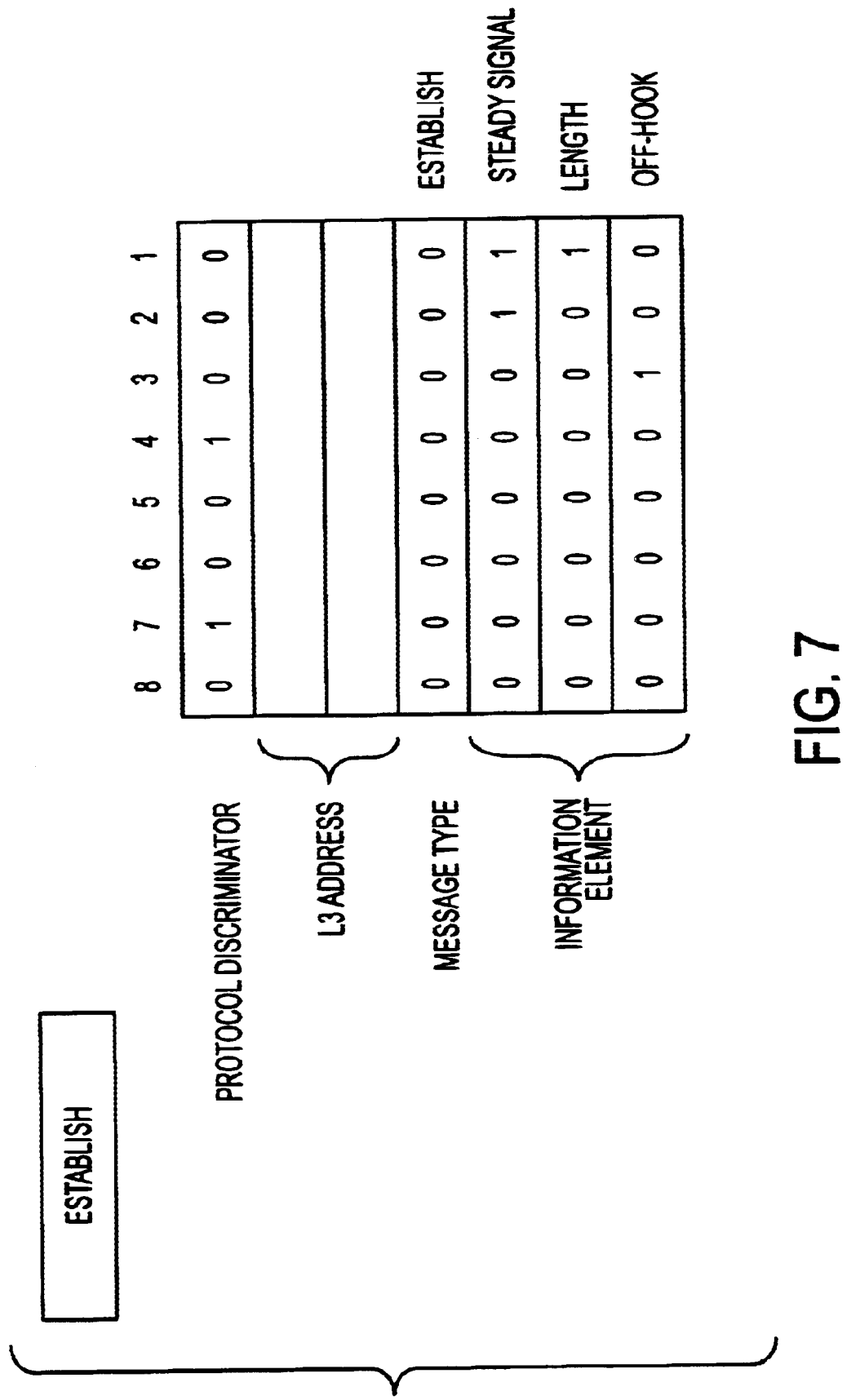
FIG. 7 shows the format of an ESTABLISH message, which conforms to V5.2.
Figure 8:
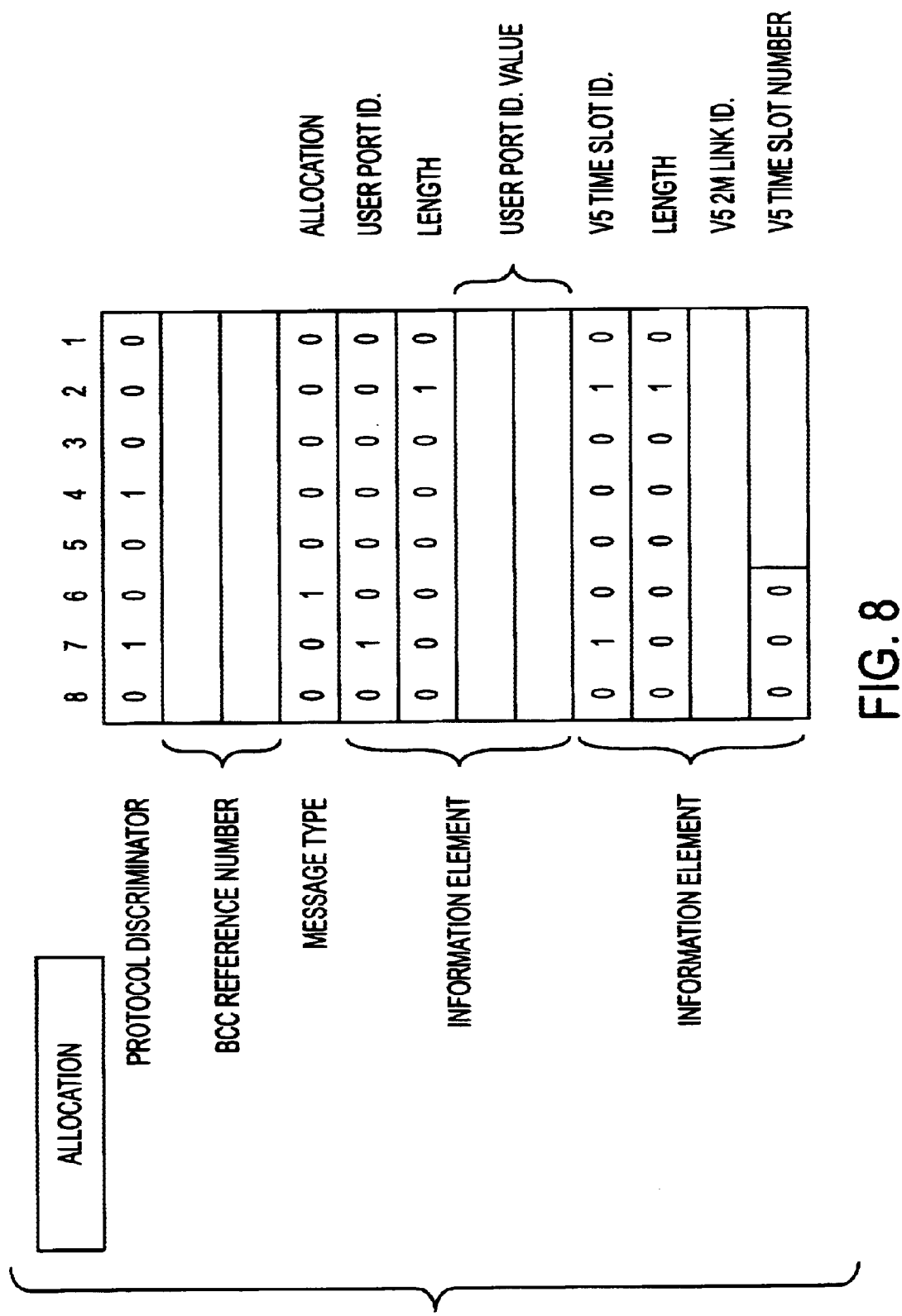
FIG. 8 shows the format of an ALLOCATION message, which conforms to V5.2.
Figure 9:
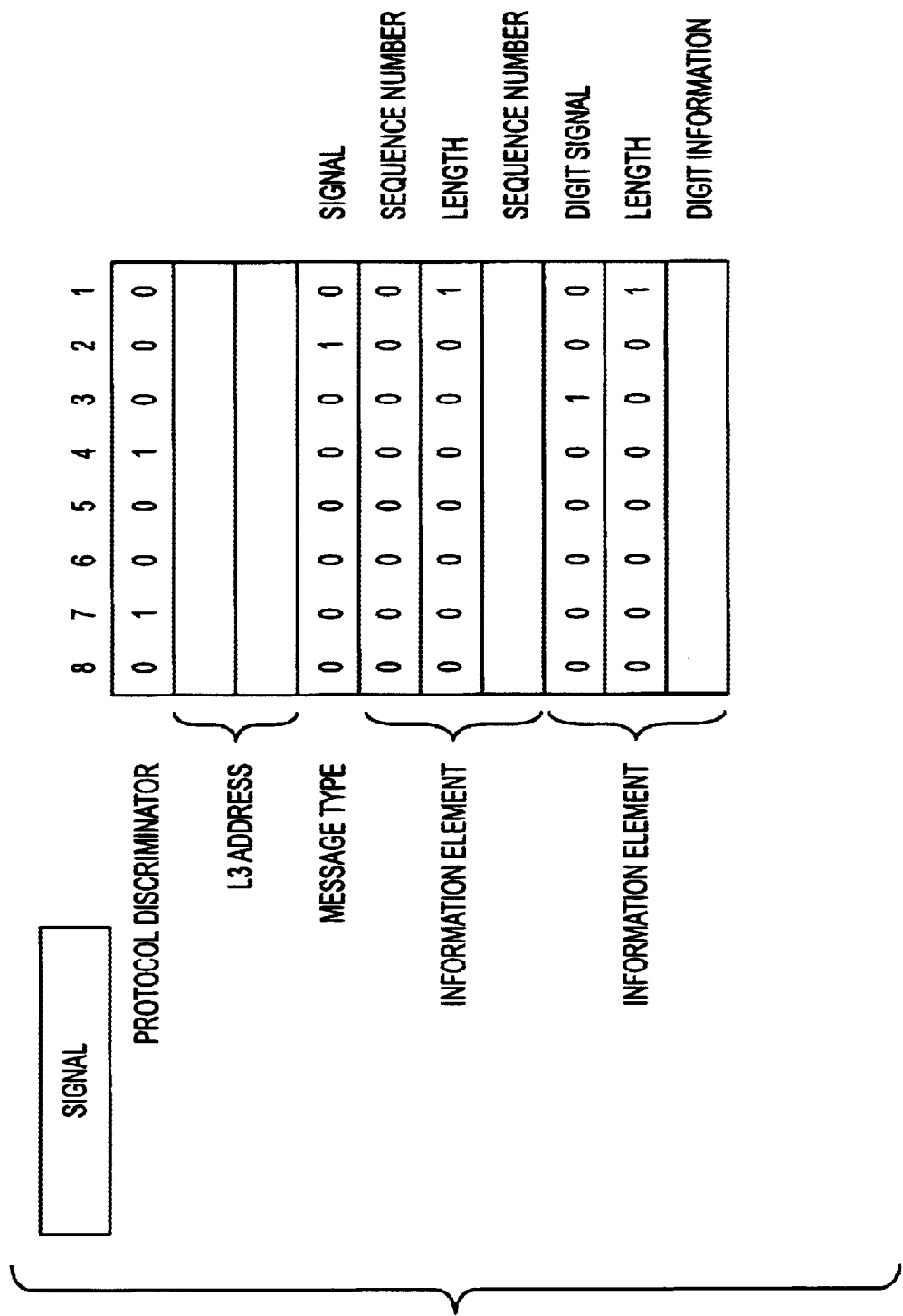
FIG. 9 shows the format of a SIGNAL message, which conforms to V5.2.

FIGS. 7 through 9 show the formats of the messages which particularly relate to the switching system according to this embodiment among the V5.2 signal messages. They respectively show the formats of an ESTABLISH message, an ALLOCATION message, and a SIGNAL message. The use purposes of these messages are shown in FIGS. 5 and 6.

Figure 10:
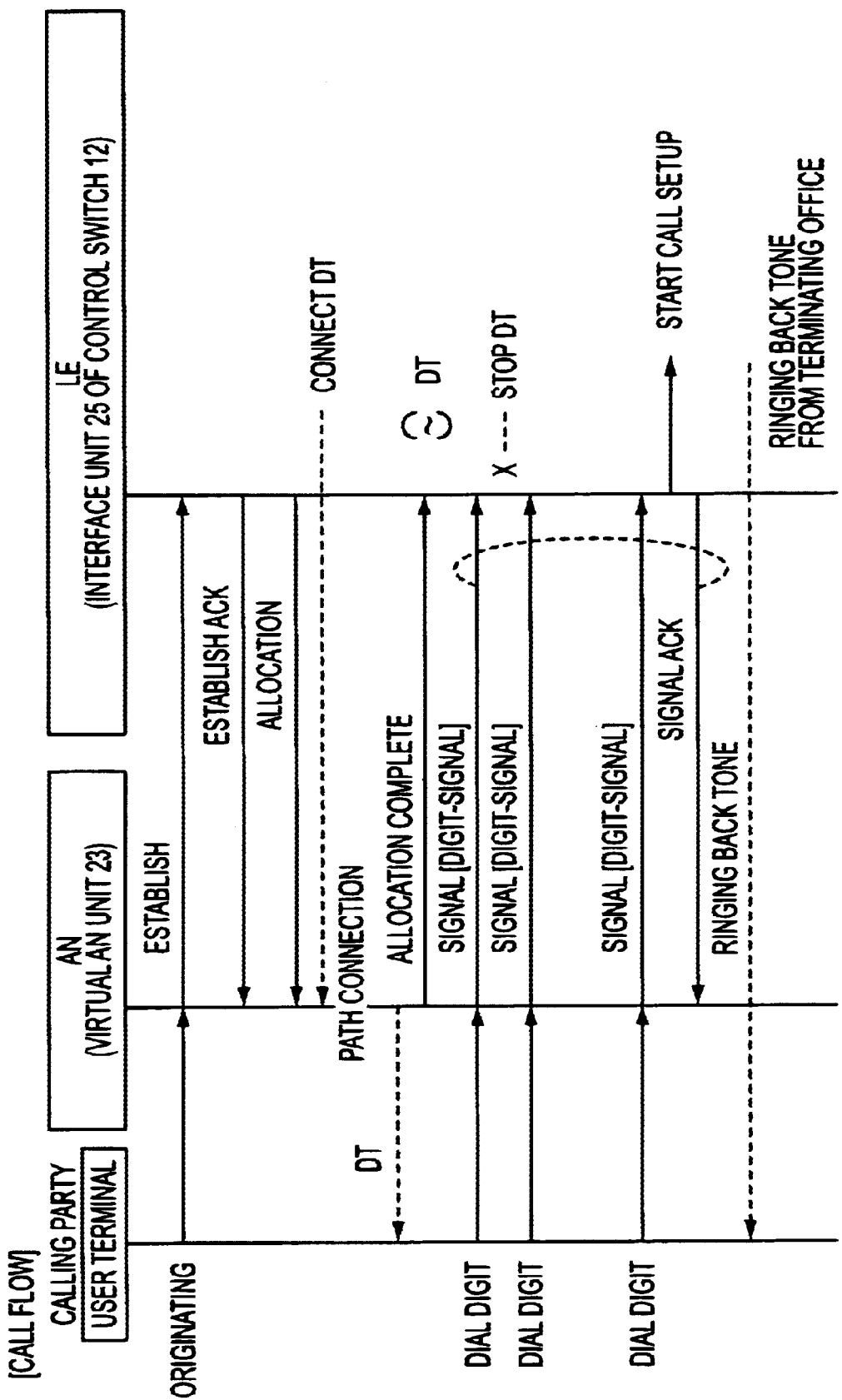
FIG. 10 exemplifies a call connection sequence according to V5.2 when a call is originated (No.1)
Figure 11:
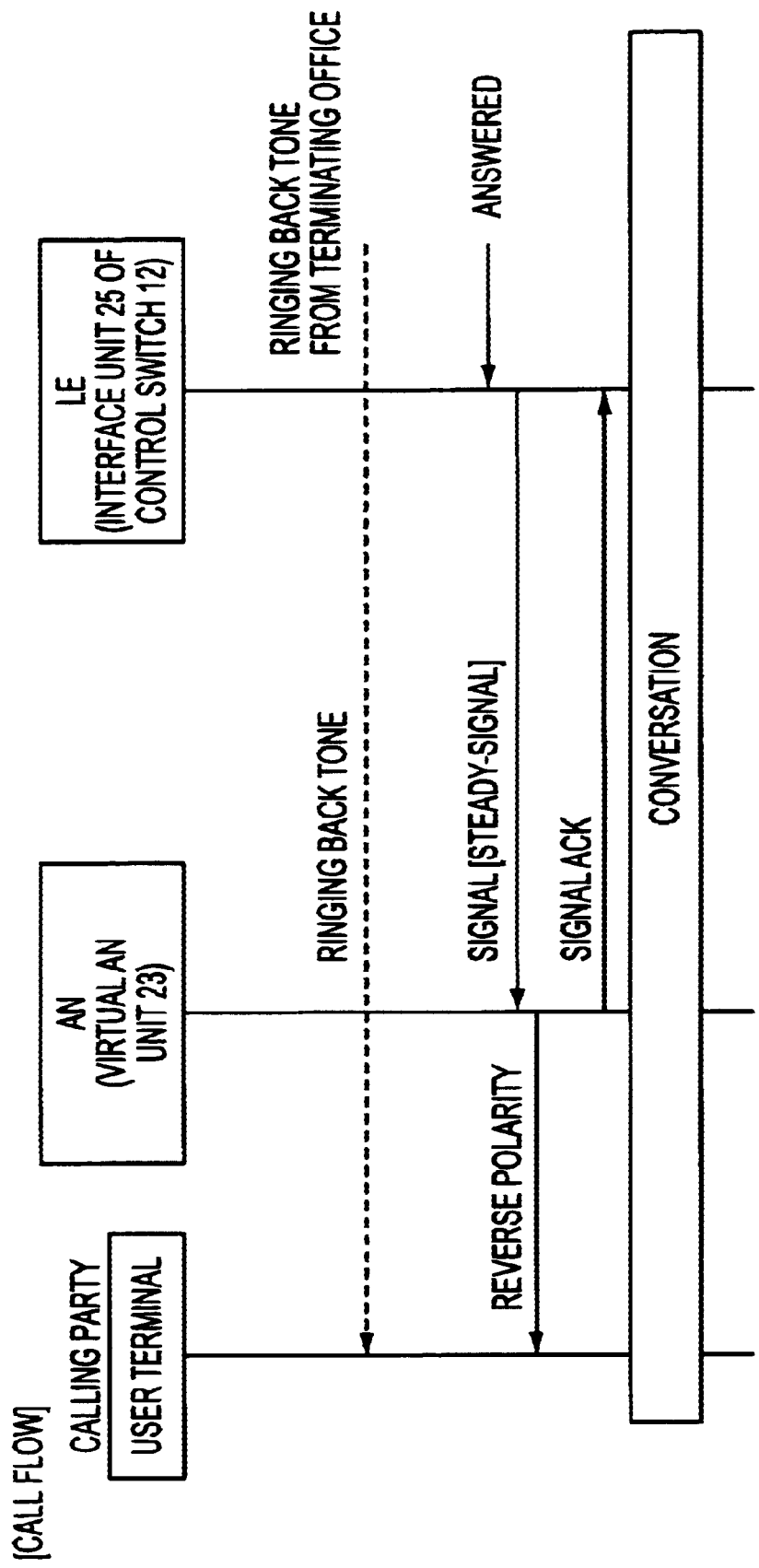
FIG. 11 exemplifies a call connection sequence according to V5.2 when a call is originated (No.2)

FIGS. 10 and 11 exemplify call connection sequences conforming to V5.2 when a subscriber accommodated by an AN originates a call. An AN and an LE respectively correspond to the virtual AN unit 23 and the interface unit 25 of the control switch 12, which are shown in FIG. 3.

When an AN subscriber (user terminal) performs an off-hook operation, the AN transmits the ESTABLISH message to the LE. This message notifies the user port ID (layer 3 address) of the AN subscriber. The user port ID is the information for identifying a subscriber in the V5.2 interface. When receiving the ESTABLISH message, the LE returns an ESTABLISH ACK (acknowledgement) message to the AN, and transmits an ALLOCATION (channel allocation) message. This message notifies the AN of the channel allocated to the communication between the AN and the LE. When receiving the ALLOCATION message, the AN returns an ALLOCATION ACk (completion) message to the LE.

When the AN subscriber inputs the number indicating a called party, the AN generates a SIGNAL message according to the number and transmits it to the LE. According to the V5.2 specification, a SIGNAl message of a dialed digit is used and notified when a calling party uses a pulse telephone set. When the calling party uses a tone telephone set, the LE receives a tone signal. When receiving the SIGNAL message, the LE transmits a SETUP message to the switch accommodating the called party, and returns a SIGNAl ACK (acknowledgement) message to the AN. The SIGNAL ACK message is transferred by a multiple SIGNAL message operation.

When the called party answers, the switch accommodating the called party notifies the LE that the called party answered, and the LE transmits a SIGNAL (steady-signal) message according to this notification. When receiving this message, the AN switches the state of the terminal of the AN subscriber (calling party) to a busy state, and returns the SIGNAL ACK message to the LE. Thereafter, the state between the AN subscriber and the called party becomes busy.

Figure 12:
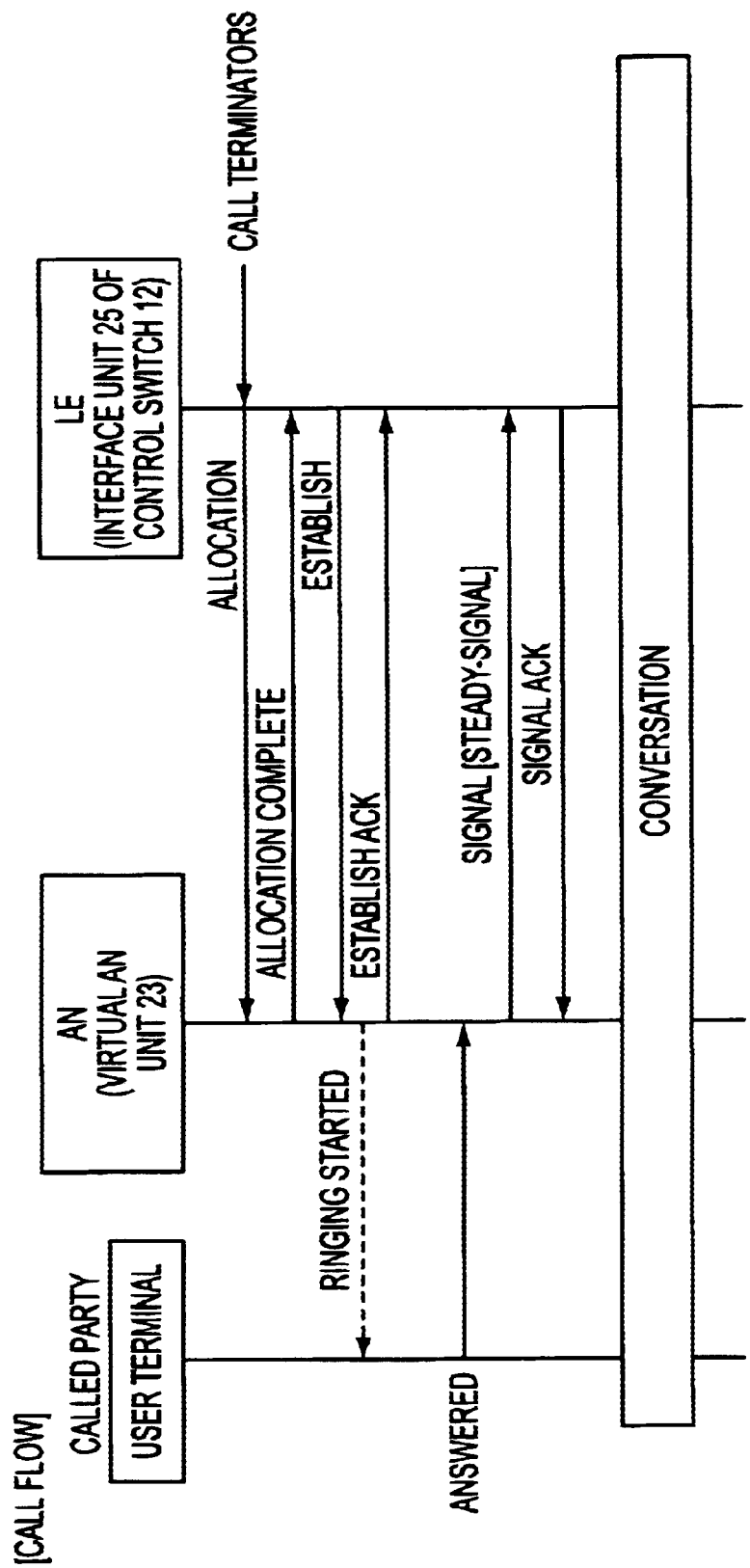
FIG. 12 exemplifies a call connection sequence according to V5.2 when a call is originated.

FIG. 12 exemplifies a call connection sequence conforming to V5.2 when a subscriber connected to an AN terminates a call.

On detecting the call terminated by the subscriber connected to the AN, the LE notifies the AN of the channel allocated between the AN and the LE by transmitting an ALLOCATION message to the AN. When receiving an ALLOCATION COMPLETE (completion) message, the LE transmits an ESTABLISH message to the AN. The ESTABLISH message includes the information for identifying a called party as a V5.2 user port ID (layer 3 address). The AN identifies the called party according to the V5.2 user port ID included in the ESTABLISH message, and calls the party.

When the called party answers, the AN transmits a SIGNAL (steady-signal) message to the LE. When the LE returns a SIGNAL ACK message in response to this message, the state between the AN subscriber and the called party becomes busy.

The virtual AN unit 23 is implemented by arranging the AN shown in FIGS. 10 through 12 in a switch. The AN shown in FIGS. 10 through 12 directly receives an off-hook signal and a dial signal from an AN subscriber. The virtual AN unit, however, is a virtual device arranged in the switch. The signal from the virtual AN subscriber is converted into an intra-office signal within the switch as described above. Accordingly, the virtual AN switch performs the conversion between the intra-office signal and the V5.2 signal message. This signal conversion process is part of the capabilities of the virtual AN unit 23. The details of the configuration and the operations of the virtual AN switch are described below.

Figure 13:
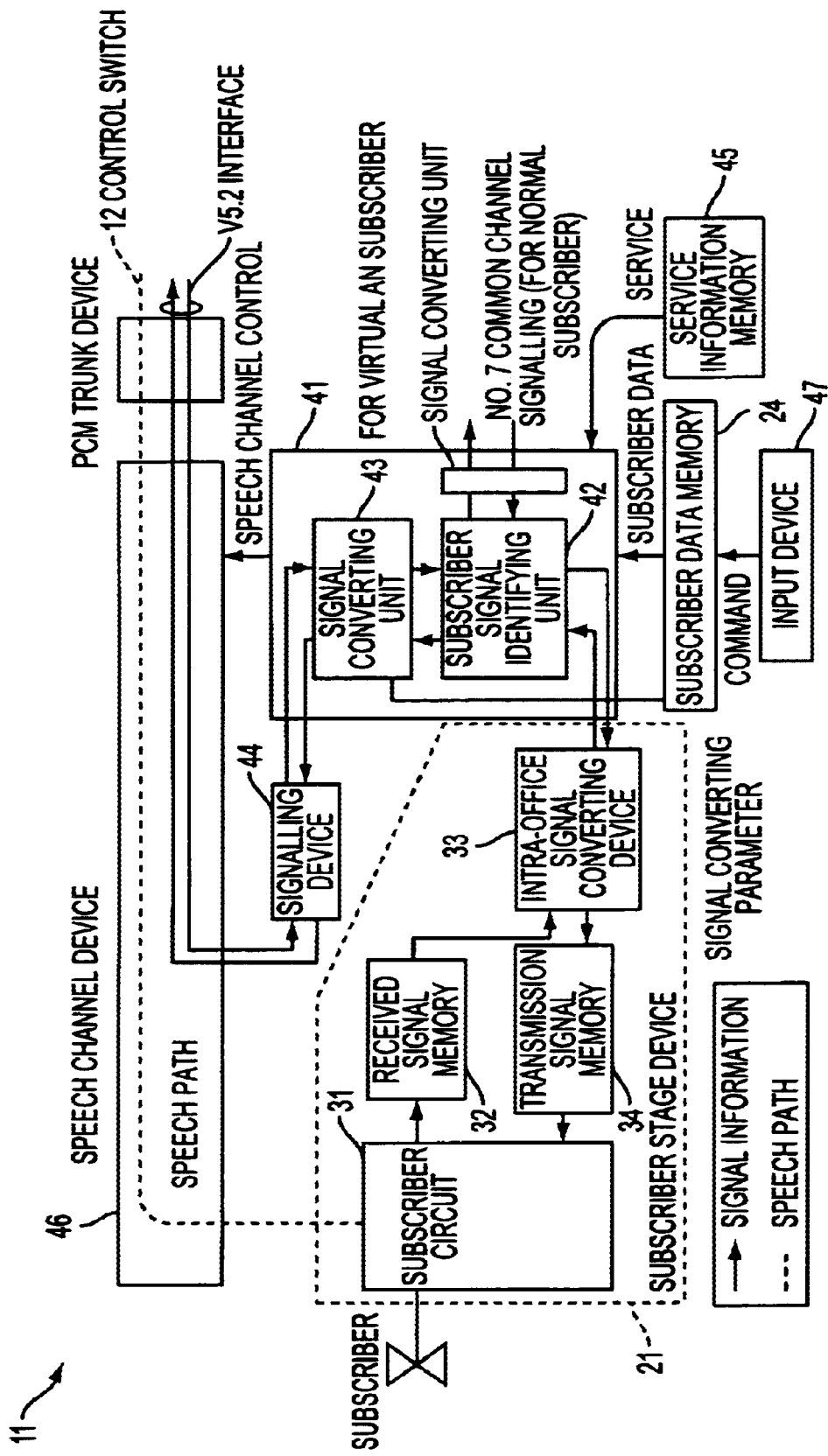
FIG. 13 is a block diagram showing the structure of a virtual AN switch.

FIG. 13 is a block diagram showing the virtual AN switch 11. A subscriber stage device 21 converts a signal from a subscriber (an off-hook event, dial event, etc.) into an intra-office signal, and outputs the converted signal. A subscriber circuit 31 terminates a subscriber line. The subscriber circuit 31 detects the state of the subscriber (basically the determination of whether or not the state is an off-hook state, etc.), and writes the detected state to a received signal memory 32.

The intra-office signal converting device 33 detects the signal from the subscriber by accessing a received signal memory 32, converts that signal into an intra-office signal, and outputs the intra-office signal to a control device 41. At this time, the intra-office signal converting device 33 outputs also the subscriber accommodation position information as the information for identifying the subscriber who output the signal. As a result, the signal from the subscriber (the event on a subscriber terminal such as an off-hook event, dial event, etc.) is converted into an intra-office signal, and transmitted to the control device 41 together with the subscriber accommodation position information for identifying the subscriber. When receiving the intra-office signal indicating the reception of the subscriber connected to the subscriber stage device 21, the intra-office signal converting device 33 writes the information indicating this reception to a transmission signal memory 34. The subscriber circuit 31 calls the called party according to the information written to the transmission signal memory 34.

When a connection is established, the subscriber circuit 31 transmits/receives the voice information transmitted/received by the subscriber via a speech channel device 46.

The subscriber stage device 21 is connected with a plurality of subscribers. That is, the subscriber stage device 21 comprises a concentrating capability. The control device 41 is shared by the plurality of subscribers.

The control device 41 controls a communication channel according to a signal received from the subscriber stage device 21 or another switch. A subscriber signal identifying unit 42 searches a subscriber data memory 24 for calling party data by using the subscriber accommodation position information received from the subscriber stage device 21 as a key, and determines whether the subscriber is either a normal subscriber or a virtual AN subscriber. The details of the subscriber data memory 24 will be described later.

If the calling party is a normal subscriber, the service including the call process is performed in the virtual AN switch 11. That is, the control device 41 invokes a predetermined program stored in a service information memory 45, and controls the communication channel. The subscriber signal identifying unit 42 transmits/receives a control signal between another switch and the unit itself with the No.7 common channel signalling, depending on need.

If the calling party is a virtual AN subscriber,the subscriber signal identifying unit 42 transfers the intra-office signal received from the subscriber stage device 21 to the signal converting unit 43. The signal converting unit 43 converts the intra-office signal into a V5.2 signal message by referencing the subscriber data stored in the subscriber data memory 24, and transmits the V5.2 signal message to the control switch 12 via a signalling device 44. The signalling device 44 is a device for controlling a signal link. As described above, once the virtual AN subscriber originates a call, the signal converting unit 43, etc are activated, so that the intra-office signal is converted into a V5.2 signal message and transmitted to the control switch 12. In this case, the virtual AN switch 11 serves as a device not for implementing a service, but for simply accommodating the virtual AN subscriber in the control switch 12 in a pseudo manner. Accordingly, the service is implemented in the control switch 12.

On receiving the V5.2 signal message from the control switch 12, the control device 41 recognizes this message as the call terminated to the virtual AN subscriber accommodated by the virtual AN switch 11, accesses the subscriber data memory 24 by using the user port ID of the called party, which is included in the V5.2 signal message, as a key, and extracts the subscriber accommodation position information for identifying the called party. The signal converting unit 43 converts the received V5.2 signal message into an intra-office signal, and transmits the intra-office signal and the subscriber accommodation position information to the subscriber stage device 21. As described above, when a call terminating to the virtual AN subscriber is detected, the signal converting unit 43, etc. is activated and the V5.2 signal message is converted into an intra-office signal. In this case, the virtual AN switch 11 serves as a remote accommodating device of the control switch 12.

Whether the subscriber accommodated by the virtual AN switch 11 is recognized as either a normal subscriber or a virtual AN subscriber, can be set depending on the information stored in the subscriber data memory 24. The structure of the subscriber data memory 24 is described below by referring to FIGS. 14A and 14B.

The subscriber data memory 24 stores subscriber data of all subscribers accommodated by the virtual AN switch 11. The subscriber data memory 24 is composed of a calling party memory to be referenced when a call is originated from a subscriber accommodated by the virtual AN switch 11, and a called party memory to be referenced when a call is terminated to a subscriber accommodated by the virtual AN switch 11. The subscriber data memory 24 in the virtual AN switch 11 stores also the data for implementing a virtual AN in addition to the normal subscriber data (subscriber data stored in an existing switch). In other words, the virtual AN switch 11 stores the data required for implementing the virtual AN as part of the subscriber data referenced when a call is originated or terminated.

The calling party memory stores the information about each subscriber so that a search can be made by using the subscriber accommodation position information, which is the information for identifying each subscriber, as a key. For the information about each subscriber, virtual AN accommodation identifying information, an AN number, and a user port ID are stored as the data for accommodating a virtual AN in addition to the normal subscriber data.

The virtual AN accommodation identifying information indicates whether or not a subscriber receives a virtual AN service, and which method is used if he or she receives the virtual AN service. As the attribute values of the virtual AN accommodation identifying information, the following values are used.

- 0: normal subscriber (non-virtual AN subscriber)
- 1: virtual AN subscriber using the semi-permanent accommodating method
- 2: virtual AN subscriber using the per-call-accommodating method
- 3: virtual AN subscriber using the dynamic load sharing method These attribute values are determined by the contract between each subscriber and a common carrier, and are written to the subscriber data memory 24 with a command input of the common carrier from an input device 47. Since the accommodation attribute of each subscriber is determined according to any of the attribute values of the virtual AN accommodation identifying information, the accommodating attribute of an arbitrary subscriber accommodated by the virtual AN switch 11 can be easily changed only by changing the attribute value with the command entry. Furthermore, a subscriber may be reverted to a normal subscriber (a subscriber who is not accommodated in a virtual AN) by cancelling the preset virtual AN subscriber attribute using a similar command.

The AN number is the information for identifying an AN in the V5.2 interface. In the virtual AN switch 11, a plurality of virtual ANs can be arranged. Assuming that subscribers "X" and "Y" are respectively accommodated in virtual "AN-X" and "AN-Y", the number for identifying the virtual AN-X and the number for identifying the AN-Y are assigned as the respective AN numbers of the subscribers "X" and "Y". The user port ID is a layer 3 address in the V5.2 interface, and is the identifying information assigned to a virtual AN subscriber.

Figure 14A:
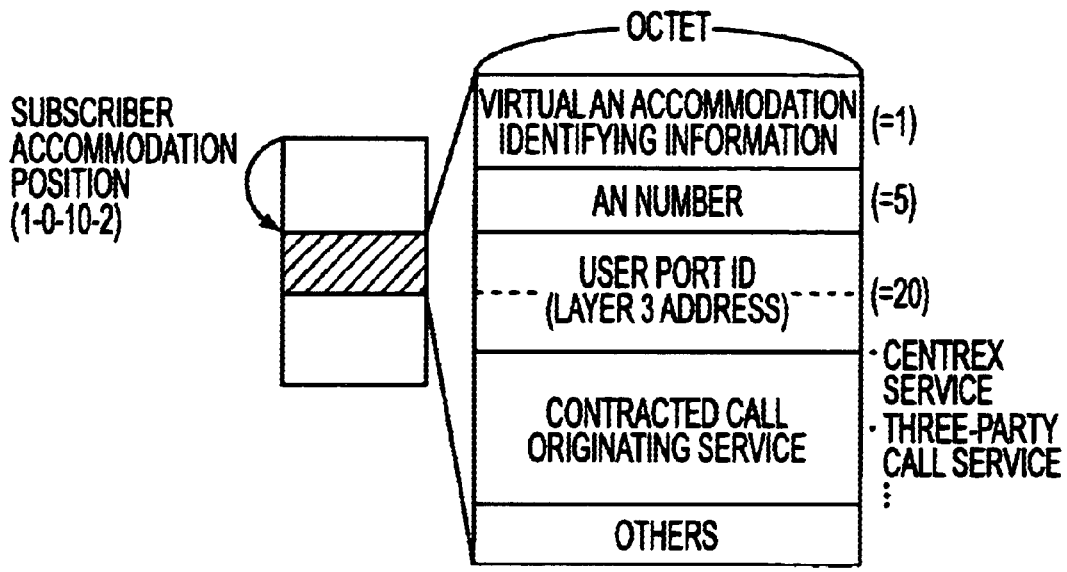
FIGS. 14A and 14B are schematic diagrams showing the structures of a subscriber data memory.

In the example shown in FIG. 14A, the subscriber whose subscriber accommodation position is "1-0-10-2" is a virtual AN subscriber using the semi-permanent accommodating method, and "5" and "20" are respectively assigned as the AN number and the user port ID.

The calling party memory stores the information for identifying a service that can be received when each subscriber originates a call. Which service each subscriber can receive depends on a contract, etc. The subscriber shown in FIG. 14A enrolls in the centrex service, three-party call service, etc. as the call originating services.

When a call is originated by a subscriber accommodated by the virtual AN switch 11, the calling party memory shown in FIG. 14A is searched by using the subscriber accommodation position information of that subscriber as a key. The virtual AN accommodation identifying information, the AN number, the user port ID, etc. of that subscriber can be obtained as the result of the search.

Figure 14B:
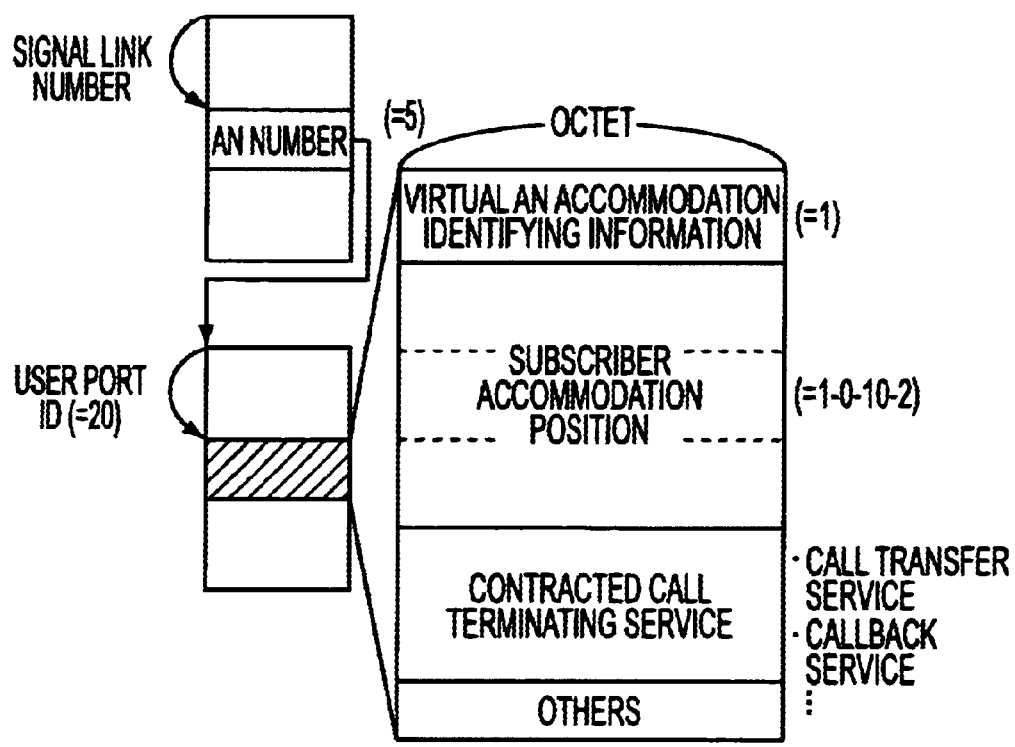

FIG. 14B is a schematic diagram showing the structure of a called party memory for virtual AN subscribers. The called party memory for virtual AN subscriber stores the information about each virtual AN subscriber by using the user port ID of each virtual AN subscriber in the V5.2 interface as a key. The subscriber data of a normal subscriber is stored not by using the user port ID as a key but by using the number generated based on his or her telephone number. Therefore, When a certain subscriber makes a contract to receive a virtual AN service, it is necessary to allow the subscriber data of that subscriber to be searched by using the user port ID assigned to the subscriber as a key.

Figures 15A, 15B:
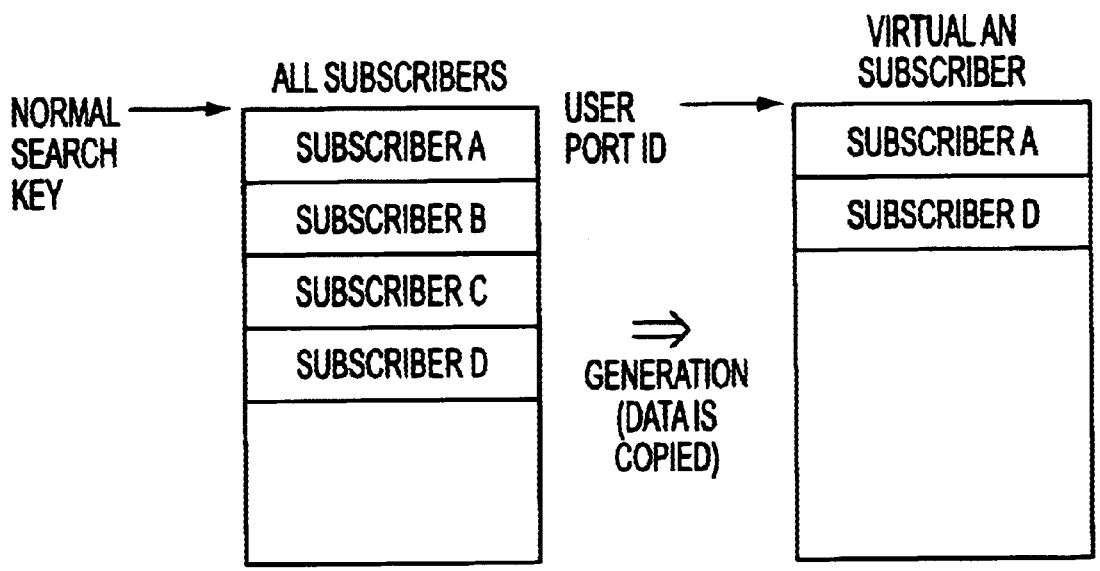
FIGS. 15A and 15B are schematic diagrams explaining the method for generating a called party memory for virtual AN subscribers.

As the method for allowing the subscriber data to be searched by using the user port ID as a key, for example, the method for newly and separately generating a subscriber data memory for virtual AN subscribers, which is shown in FIG. 15A, may be considered. In the example shown in FIG. 15A, the subscribers A, D, . . . among the subscribers A, B, C, D, . . . accommodated by the virtual AN switch 11 receive the virtual AN service. In this case, the subscriber data for the virtual AN subscribers are stored using the user port IDs of the respective virtual AN subscribers as keys. The subscriber data memory for virtual AN subscribers stores the virtual AN accommodation identifying information of the respective virtual AN subscribers.

Otherwise, a table for making a correspondence between the user port ID of the virtual AN subscriber and the search key (normal search key) used for searching the subscriber data if the virtual AN subscriber is a normal subscriber, may be generated as shown in FIG. 15B. When the subscriber data is extracted by using the user port ID as a key, the user port ID is converted into a normal search key referring to the table shown in FIG. 15B, and the subscriber data is extracted by using the normal search key. In this case, the data block for setting the virtual AN accommodation identifying information of each subscriber is assumed to be allocated beforehand. With such a configuration, the table storing the existing subscriber data can be used.

The called party memory for virtual AN subscribers shown in FIG. 14B depicts the state in which the search key of the subscriber data of the virtual AN subscriber is stored as the user port ID. The called party memory for virtual AN subscribers stores the virtual AN accommodation identifying information, the subscriber accommodation position information, etc. in addition to the normal subscriber data. Note that the virtual AN accommodation identifying information in the called party memory is set in synchronization with the setting in the calling party memory. Additionally, the called party memory stores the information for identifying a call terminating service contracted by each subscriber. The subscriber shown in FIG. 14B enrolls in a call transfer service, a callback service, etc.

The called party memory for virtual AN subscribers is arranged for each AN (for each virtual AN). Accordingly, when a call is terminated to the virtual AN subscriber, the AN number of the virtual AN to which the virtual AN subscriber is connected is first extracted, and the called party memory corresponding to the AN number is accessed.

Note that each AN (virtual AN), which is arranged for each signal link of the V5.2 interface, can detect the signal link (the Primary Link or the Secondary Link, which are shown in FIG. 4) which transferred the V5.2 signal message related to a terminated call when the call is terminated by using the V5.2 interface. Therefore, the called party memory for virtual AN subscribers stores the AN number corresponding to the signal link by using the signal link number as a key as shown in FIG. 14B, and the data block to which the called party belongs is accessed by using the AN number.

When a call from the control switch 12 to the virtual AN is terminated by using the V5.2 interface, the called party memory is searched by using the user port ID included in the received V5.2 signal message as a key, so that the virtual AN accommodation identifying information, the subscriber accommodation position information, etc. of the called party can be obtained as the result of the search.

As described above, whether the subscriber accommodated by the virtual AN switch 11 is handled as either a normal subscriber or a virtual AN subscriber can be set depending on the subscriber data stored in the subscriber data memory 24. That is, an arbitrary subscriber can be accommodated by a virtual AN without changing the accommodation position of a subscriber line or the connection of a cable.

Provided below is the explanation about the process performed by the signal converting unit 43. As described above, the signal converting unit 43 performs the conversion between an intra-office signal and a V5.2 signal message when a call is originated or terminated by a virtual AN subscriber. FIG. 16A and 16B exemplify the structure of a signal conversion table used for this conversion.

FIG. 16A shows a table used when a signal is output from a virtual AN subscriber. An off-hook message is an intra-office signal that the subscriber stage device 21 generates when it detects an off-hook operation at the time of a call originated by a subscriber accommodated by the virtual AN switch 11. The subscriber stage device 21 outputs the information (subscriber accommodation position information) for identifying the subscriber who performed the off-hook operation as a parameter of the off-hook message. A Digit Info message is an intra-office signal that the subscriber stage device 21 generates based on the number information output from the subscriber accommodated by the virtual AN switch 11. The subscriber stage device 21 outputs the subscriber accommodation position information of the subscriber who output the number information and the digits indicating the number. An Answer message is an intra-office signal that the subscriber stage device 21 generates when it detects an off-hook operation if the subscriber accommodated by the virtual AN switch 11 performs the off-hook operation at the time of the terminated call. The subscriber stage device 21 outputs the subscriber accommodation position information of the subscriber who performed the off-hook operation as a parameter of the Answer message.

The signal converting unit 43 respectively converts the above described intra-office signals (the off-hook message, the Digit Info message, and the Answer message) into the V5.2 signal messages shown in FIG. 16A. Furthermore, the signal converting unit 43 converts the subscriber accommodation position information for identifying the subscriber by referencing the calling party memory shown in FIG. 14A into a user port ID (layer 3 address) of the V5.2 interface, when it converts a parameter of an intra-office signal.

FIG. 16B shows the table used when the virtual AN switch 11 receives a V5.2 signal message from the control switch 12. The signal converting unit 43 converts the received V5.2 signal message into an intra-office signal according to the table shown in FIG. 16B. Note that the signal converting unit 43 references the called party memory shown in FIG. 14B when it converts the user port ID (layer 3 address) included in a parameter of the V5.2 signal message.

Provided next is the explanation about the operations of the switching system according to this embodiment.

Figure 17:
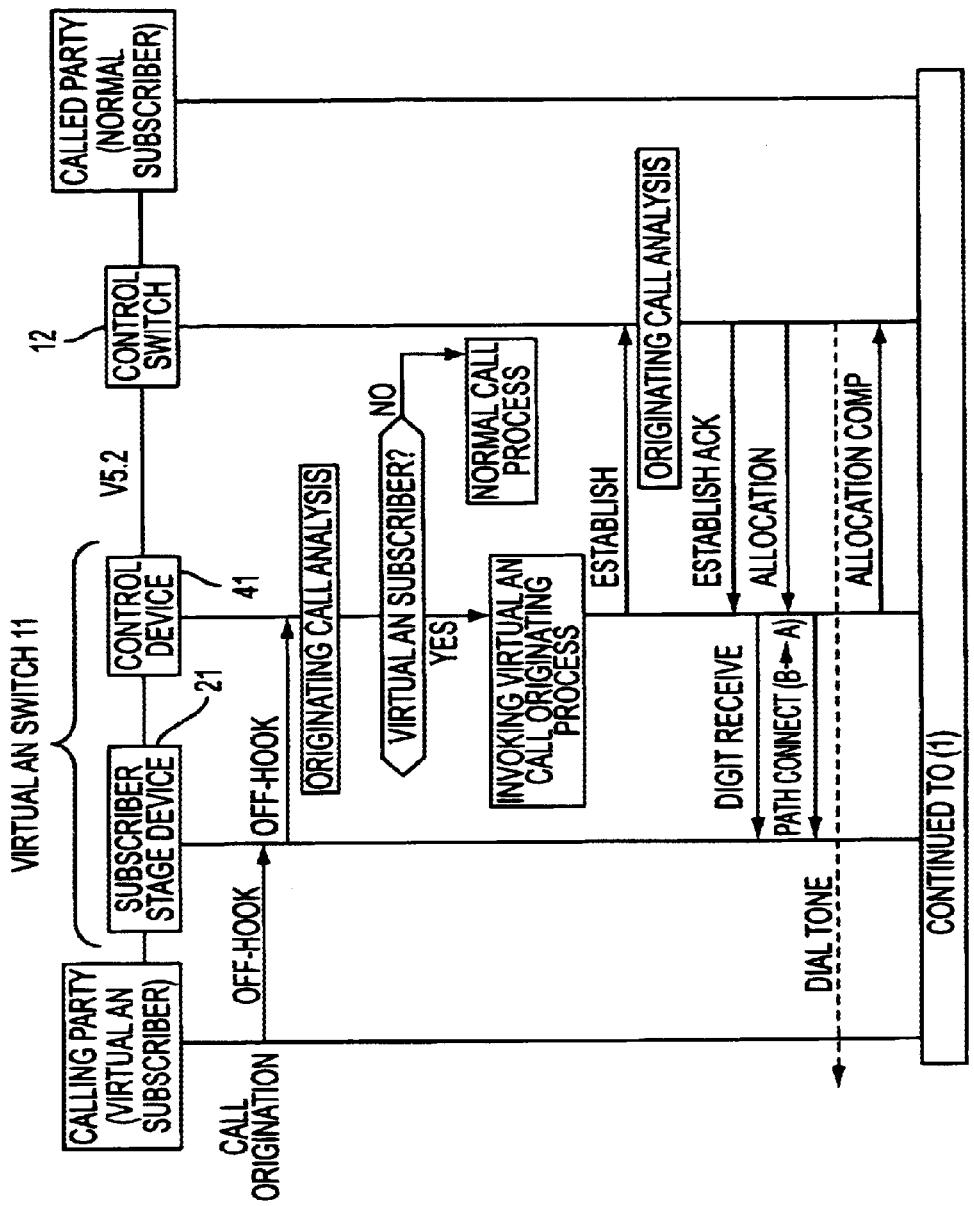
FIG. 17 shows a call originating sequence of a virtual AN subscriber accommodated using a semi-permanent method (No.1)
Figure 18:
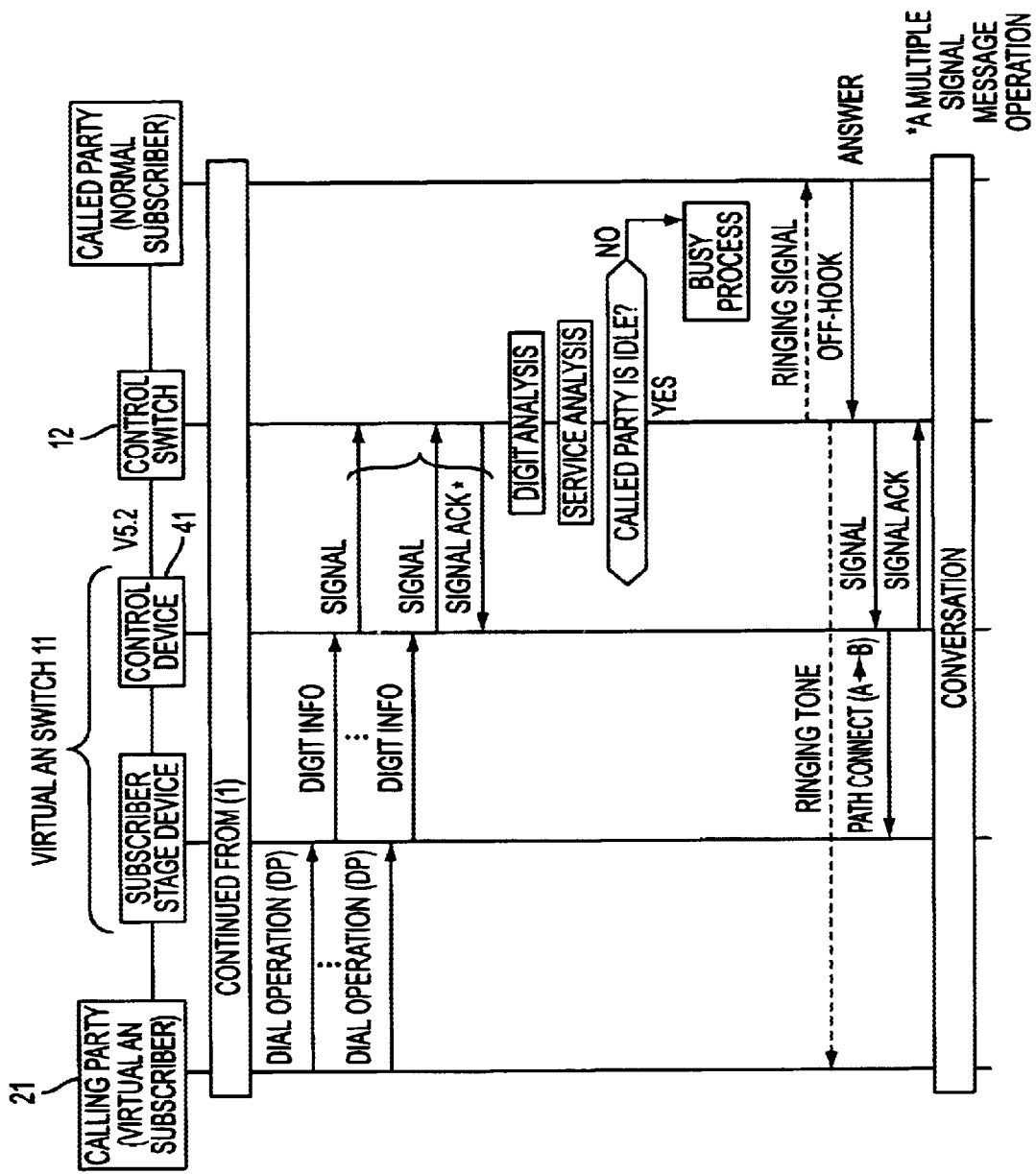
FIG. 18 shows a call originating sequence of the virtual AN subscriber accommodated using the semi-permanent method (No.2)

FIGS. 17 and 18 show a process sequence when a virtual AN subscriber originates a call. Provided here is the explanation about the case in which the virtual subscriber accommodated by the virtual AN unit 23 in the virtual AN switch 11 with the semi-permanent accommodating method originates the call. Furthermore, the called party (normal subscriber) is assumed to be accommodated in the control switch 12.

A call originating signal (off-hook signal) from the calling party is detected by the subscriber stage device 21. The subscriber stage device 21 outputs the off-hook signal to the control device 41 by adding the subscriber accommodation position information for identifying the calling party as a parameter when detecting the off-hook operation of the calling party.

On receiving the off-hook signal, the control device 41 performs an originating call analysis process. That is, the control device 41 determines whether or not the calling party is a virtual AN subscriber by searching the calling party memory in the subscriber data memory 24 shown in FIG. 14A using the subscriber accommodation position information transferred from the subscriber stage device 21 as a key, and examining the virtual AN accommodation identifying information. If the calling party is a normal subscriber, the control device 41 performs a normal call process. That is, the virtual AN switch 11 itself processes this originating call.

If the calling party is a virtual AN subscriber (who made the contract for the semi-permanent accommodating method), the control device 41 accesses the calling party memory shown in FIG. 14A by using the subscriber accommodation position information of the calling party as a key, reads out the parameters (the user port ID, the AN number, etc.) required for transmitting/receiving the signal using the V5.2 interface, and sets the parameters in the signal converting unit 43 in the control device 41 (invocation of the virtual AN call originating process).

The signal converting unit 43 converts an intra-office signal into a V5.2 signal message based on the signal conversion table shown in FIG. 16. That is, the signal converting unit 43 converts the off-hook signal from the calling party into the ESTABLISH message. The user port ID in the V5.2 interface, which is read from the calling party memory, is assigned to the ESTABLISH message as the information for identifying the calling party. The control device 41 then transmits the ESTABLISH message to the control switch 12 via the signalling device 44.

The control switch 12 performs the same operations as those performed when a normal AN transmits/receives a V5.2 signal message, in order to transmit/receive the V5.2 signal message between the virtual AN switch 11 and the control switch 12 itself. Namely, the control switch 12 does not need to make a distinction between the normal AN and the virtual AN unit 23 arranged in the virtual AN switch 11. Therefore, the operations of the control switch 12 after it receives the ESTABLISH message are similar to the operations explained by referring to FIGS. 10 and 11. That is, the control switch 12 analyzes the call origination based on the received ESTABLISH message and the subscriber data which is preset in the control switch 12. It accepts the call origination if the calling party is a legal subscriber, and returns the ESTABLISH ACK message to the virtual AN switch 11.

On receiving the ESTABLISH ACK message from the control switch 12, the control device 41 converts the V5.2 signal message into an intra-office signal in the signal converting unit 43 according to the table shown in FIG. 16B. This signal conversion generates a Digit Receive signal. At this time, the control device 41 converts the user port ID of the calling party, which is assigned to the ESTABLISH ACK message, into the subscriber accommodation position information. The control device 41 transmits this Digit Receive signal to the subscriber stage device 21. Then, the subscriber stage device 21 enters into a state for waiting for a dial input from the calling party.

Next, the control switch 12 transmits the ALLOCATION message according to the standard protocols of V5.2. The ALLOCATION message is a message for allocating a communication channel on the V5.2 PCM link between the control switch 12 and the virtual AN unit 23 in the virtual AN switch 11. The control device 41 generates a Path Connect signal according to the ALLOCATION message. With the Path Connect signal, the downward speech path (in the direction from the switch to the calling party) is set in the virtual AN switch 11. Then, a dial tone (a signal for notifying a user that a dial input has been made possible) is transmitted from the control switch 12 to the calling party via this speech path.

The digits that the calling party dials are input to the control device 41 of the virtual AN switch 11 as Digit Info signals. The signal converting unit 43 sequentially converts the received Digit Info signals into SIGNAL messages which are V5.2 signal messages according to the conversion table shown in FIG. 16A, and transmits these SIGNAL messages to the control switch 12 via the signalling device 44.

After returning the SIGNAL ACK message to the virtual AN switch 11, the control switch 12 recognizes the called party and the service to be invoked by performing a normal digit analysis process and a service analysis process. Note that the service is assumed to be designated by the dial input of the calling party. The control switch 12 then determines whether the state of the called party is either idle or busy. If the state is busy, the control switch 12 performs a busy process. If the state is idle, the control switch 12 transmits a ringing signal.

When the called party answers the ringing signal by performing an off-hook operation, the control switch 12 notifies the virtual AN switch 11 that the called party answered by using the SIGNAL message stipulated by V5.2. The control device 41 in the virtual AN switch 11 converts the received SIGNAL message into a Path Connect signal. With this intra-office signal, an upward speech path (in the direction from the calling party to the switch) is established in the virtual AN switch 11. The control device 41 returns the SIGNAL ACK message to the control switch 12. According to the above described sequence, the speech path is established between the virtual AN subscriber who originated the call and the called party accommodated in the control switch 12.

As described above, the virtual AN switch 11 converts the signal from the virtual AN subscriber into a V5.2 signal message and transfers it to the control switch 12, when the virtual AN subscriber originates a call. The service accompanying the call origination of the virtual AN subscriber (the process for determining a called party and calling the called party in this case) is implemented in the control switch 12.

Figure 19:
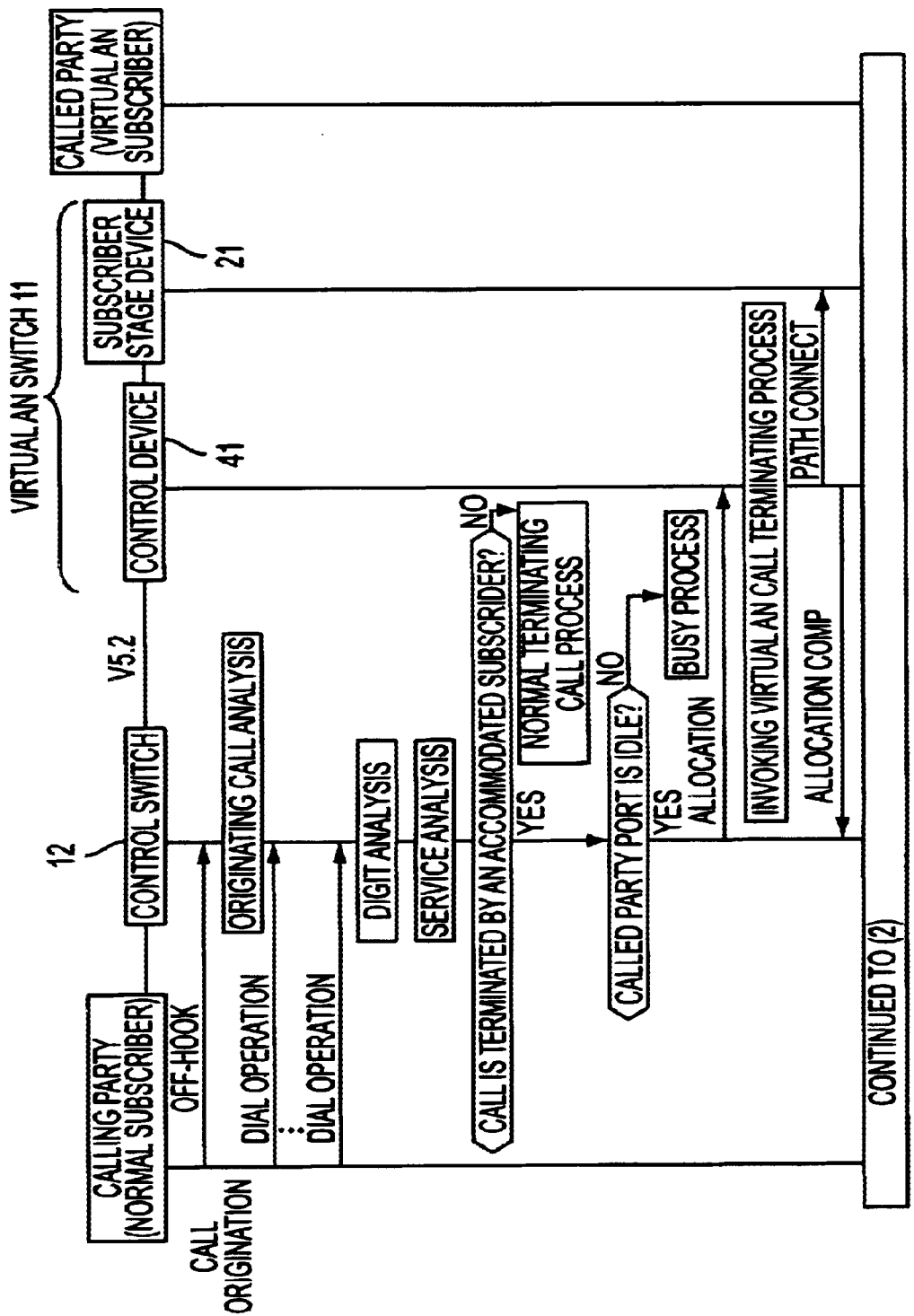
FIG. 19 shows a call terminating sequence of the virtual AN subscriber accommodated using the semi-permanent method (No.1)
Figure 20:
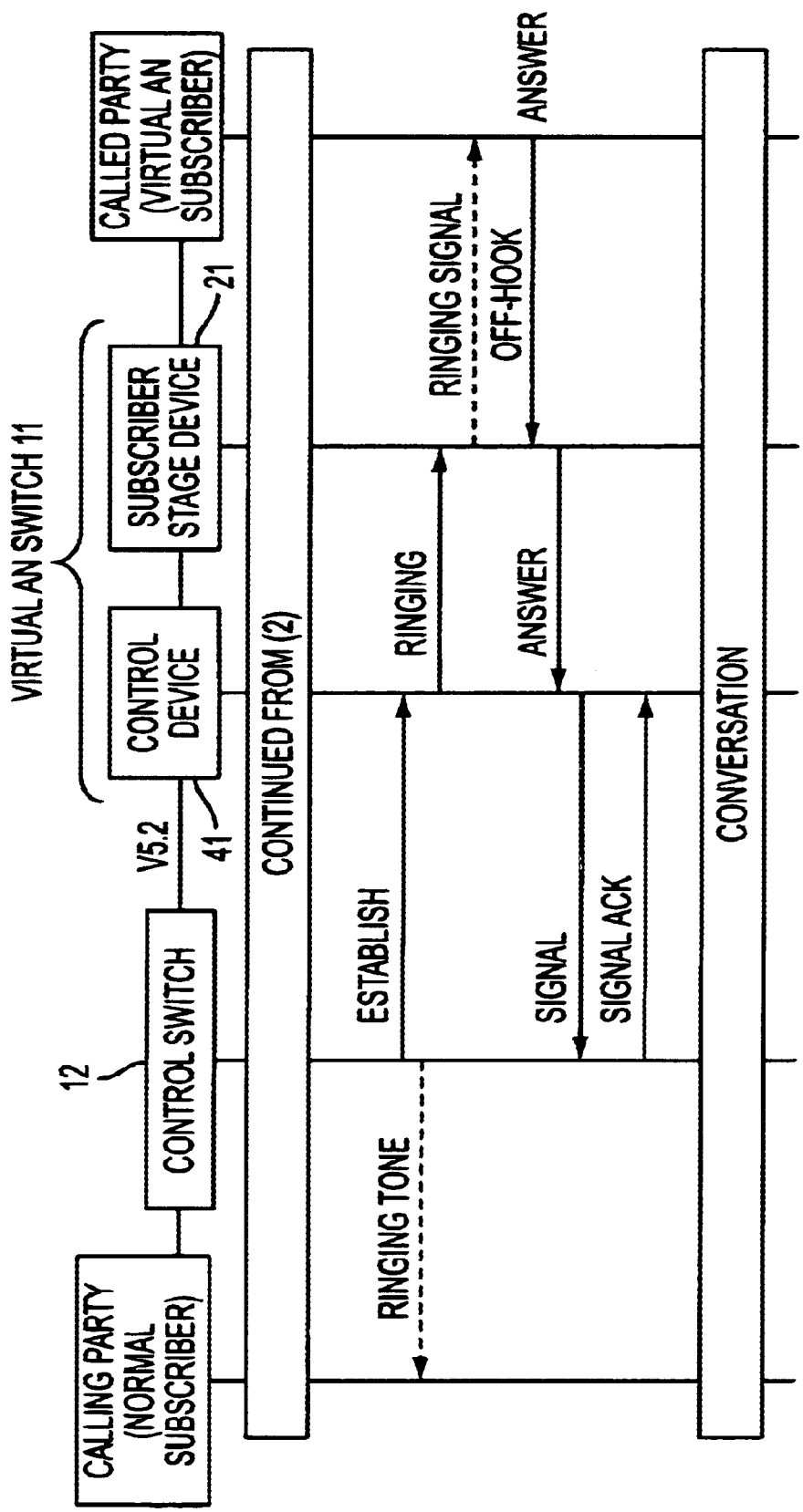
FIG. 20 shows a call terminating sequence of the virtual AN subscriber accommodated using the semi-permanent method (No.2)

FIGS. 19 and 20 show a process sequence when a virtual AN subscriber terminates a call. Provided here is the explanation about the operations when the virtual AN subscriber accommodated by the virtual AN unit 23 in the virtual AN switch 11 with the semi-permanent accommodating method terminates the call. The calling party is assumed to be a normal subscriber accommodated by the control switch 12. Note that a call from a subscriber accommodated by a switch other than the virtual AN switch 11 and the control switch 12 to a virtual AN subscriber accommodated by the virtual AN switch 11 must be routed via the control switch 12. Accordingly, the telephone number with which the call terminated by the virtual AN subscriber is routed to the control switch 12 is assigned to the virtual AN subscriber accommodated by the virtual AN switch 11.

When the calling party dials the telephone number of the called party (virtual AN subscriber accommodated by the virtual AN switch 11), the control switch 12 performs a normal digit analysis process and a service analysis process. If the control switch 12 recognizes that the called party is a virtual AN subscriber as a result of the analysis, it generates and transmits an ALLOCATION message so as to notify the virtual AN switch 11 of the signal channel on the PCM link, which is to be used as a conversation channel between the control switch 12 and the virtual AN switch 11. The control switch 12 has the capability for converting the telephone number of a called party into a user port ID (layer 3 address) in the V5.2 interface, which is assigned to the called party. The ALLOCATION message includes the user port ID of the virtual AN subscriber who is the called party. The control switch 12 executes same sequence that used for transmitting/receiving the V5.2 signal message between a normal AN and the control switch 12 itself, when it transmits/receives the V5.2 signal message between the virtual AN unit 23 arranged in the virtual AN switch 11 and the control switch 12 itself.

On receiving the ALLOCATION message, the control device 41 in the virtual AN switch 11 can recognize that the message indicates the call to be terminated to the virtual AN subscriber, and immediately invokes a virtual AN call terminating process.

With the virtual AN call terminating process, the signal link which transmitted the ALLOCATION message from the control switch 12 is first recognized by the control device 41. The link transmitting the V5.2 signal message is either of the Primary Link and the Secondary Link, which are shown in FIG. 4 as described above. The control device 41 then recognizes the virtual AN accommodating the virtual AN subscriber by accessing the called party memory shown in FIG. 14B using the recognized signal link number as a key. Additionally, the control device 41 searches the called party memory shown in FIG. 14B by using the user port ID of the called party, which is included in the received ALLOCATION message as a key, extracts the subscriber accommodation position information of the called party, and sets this information in the signal converting unit 43 (invocation of the virtual AN call terminating process).

The signal converting unit 43 converts the received ALLOCATION message into a Path Connect signal which is an intra-office signal. The Path Connect signal stores the information for identifying the conversation channel set in the ALLOCATION message. With this process, the subscriber stage device 21 allocates a speech path within the virtual AN switch The control device 41 in the virtual AN device 11 transmits the ALLOCATION COMPLETE message to the control switch 12 after the above described process. When receiving this message, the control switch 12 transmits the ESTABLISH message to the virtual AN switch 11 according to the standard protocols of V5.2.

On receiving the ESTABLISH message, the virtual AN switch 11 converts this message into a Ringing signal in the signal converting unit 43. On receiving the Ringing signal, the subscriber stage device 21 transmits a ringing signal to the called party according to the contents of the ringing signal.

When the called party answers to the ringing signal by performing an off-hook operation, the subscriber stage device 21 notifies the control device 41 that the called party has been answered, as an Answer signal. The control device 41 notifies the control switch 12 of the answer of the called party by converting the Answer signal into a SIGNAL message in the signal converting unit 43, and transmitting the converted message to the control switch 12. When the control switch 12 returns the SIGNAL ACK message to the virtual AN switch 11 in response to the SIGNAl message, a speech path is established between the calling party and the called party.

As described above, the service accompanying the call terminated to the virtual AN subscriber when the virtual AN subscriber accommodated by the virtual AN switch 11 terminates the call (the process for determining the destination and securing the speech path in this case) is performed in the control switch 12.

Figure 21:
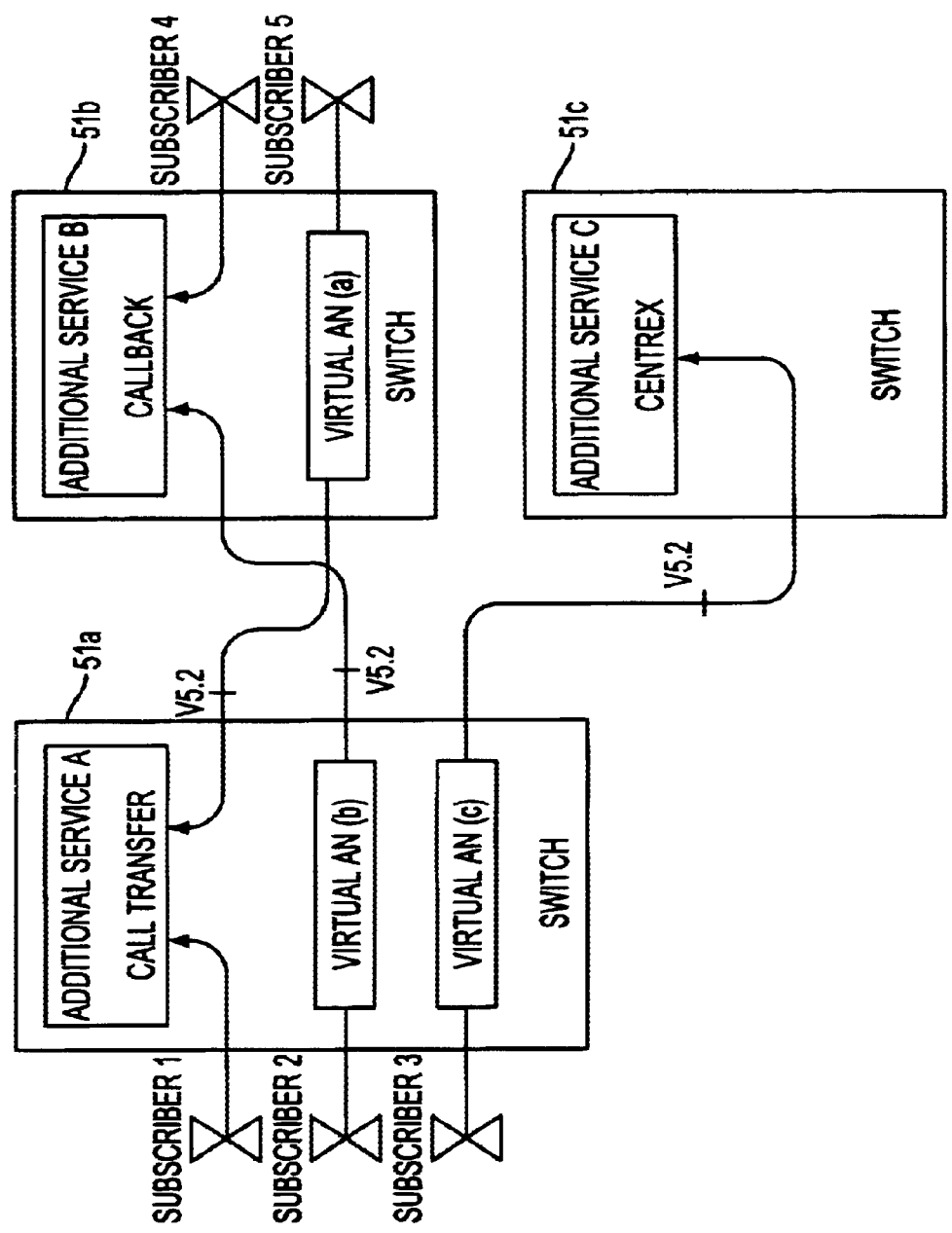
FIG. 21 is a schematic diagram explaining a method for making an external node as a service provisioning node by using a virtual AN capability.

FIG. 21 is a schematic diagram explaining the method for making an external node (another switch) as a service provisioning node by using the above described virtual AN capability. In this example, switches 51a, 51b, and 51c respectively support the additional services A, B, and C. Each of the additional services A, B, and C is an aggregate of one or more service provided by each of the switches, and is stored as a software program. For example, a program for providing a call transfer service is stored as the additional service A. The switch 51a includes a virtual AN(b) and a virtual AN(c). The virtual AN(b) and the virtual AN(c) are virtual AN devices which are respectively connected to the switches 51b and 51c. The switch 51b includes the virtual AN(a) connected to the switch 51a. Each of the virtual ANs is connected to another switch via the V5.2 interface.

If a subscriber accommodated by the switch 51a does not require a particular additional service, or if the subscriber receives the additional service provided by the switch 51a, he or she will be accommodated by the switch 51a as a normal subscriber without using a virtual AN, similar to the subscriber 1. In this case, the virtual AN accommodation identifying information of the subscriber 1 is set to "0" in the subscriber data memory 24.

If the subscriber accommodated by the switch 51a desires to receive the service provided by the switch 51b, a setting may be made in order to accommodate the subscriber in the virtual AN (b) connected to the switch 51b via the V5.2 interface, similar to the subscriber 2. In this case, the virtual AN accommodation identifying information of the subscriber (subscriber 2) is set to "1: semi-permanent accommodating method", and the number for identifying the virtual AN(b) is set as the AN number. With such a setting, the subscriber 2 receives the service that the switch 51b provides by requesting the service to the switch 51b in a communication related to the subscriber 2 via the virtual AN interface. Namely, in the communication related to the subscriber 2, the switch 51a provides only the AN capability, and the switch 51b implements the service.

Similarly, if the subscriber accommodated by the switch 51a desires to receive the service provided by the switch 51c, a setting for accommodating the subscriber in the virtual AN(c) may be made, similar to the subscriber 3. In this case, the virtual AN accommodation identifying information of the subscriber (subscriber 3) is set to "1", and at the same time the number for identifying the virtual AN(c) is set as the AN number, in the subscriber data memory 24.

The switch 51a may serve as the control switch 12 shown in FIG. 3 by equipping it with the interface capability.of the LE stipulated by V5.2. That is, if a subscriber accommodated by a switch other than the switch 51a desires to receive the service provided by the switch 51a, a setting may be made in order to accommodate the subscriber in the virtual AN (a) connected to the switch 51a via the V5.2 interface, similar to the subscriber 5 accommodated in the switch 51b.

The signal sequences between a virtual AN and another switch are like the sequences shown in FIGS. 17 through 20.

With the virtual AN capability, a switch which actually accommodates a subscriber can be separated from a switch which implements a service requested in a communication related to the subscriber, as described above. Accordingly, the virtual AN subscriber can receive a desired service provided by another switch without changing the connection of a subscriber line.

Additionally, a City-Wide centrex service can be implemented using the virtual AN capability. In this case, a switching center for providing the centrex service is arranged in a network, and at the same time, the virtual AN capability is introduced into each switch in the network. Each switch and the switching center for the centrex service is connected by the V5.2 interface. Since the subscriber who is to receive the centrex service will normally and always use this service, the semi-permanent accommodating method shown in FIGS. 17 through 20 is suitable as the method for accommodating the subscriber in a virtual AN.

Figure 22:
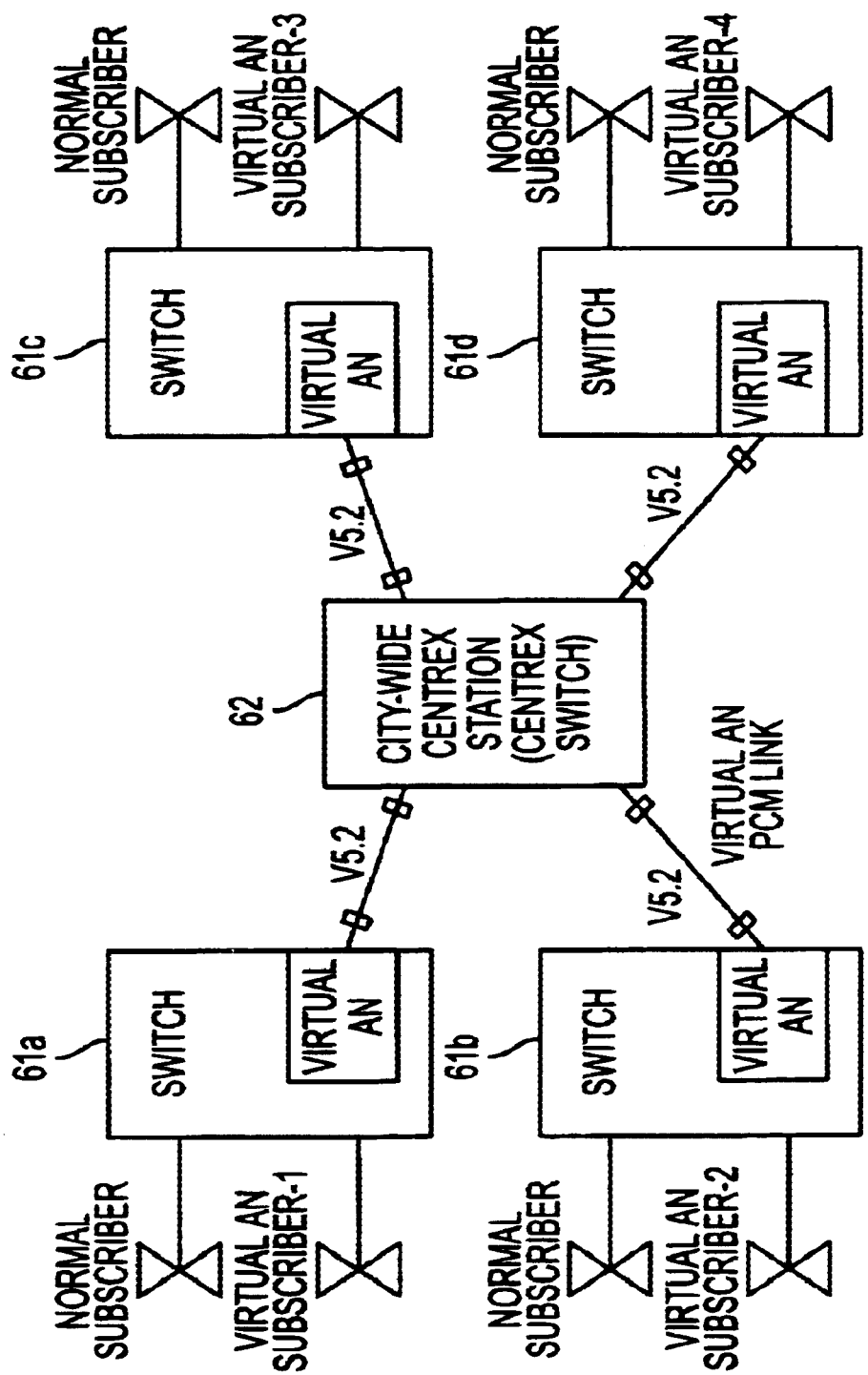
FIG. 22 is a schematic diagram showing the configuration for implementing a City-Wide centrex service by using the virtual AN capability.

FIG. 22 is a schematic diagram showing the configuration for implementing the City-Wide centrex service by using the virtual AN capability. Switches 61a through 61d are respectively arranged in different station buildings. Additionally, the switches 61a through 61d respectively include virtual ANs. A City-Wide centrex station 62 is a switch for providing the centrex service, and provides the capability of the V5.2 LE. That is, the centrex station 62 has the capability for terminating a V5.2 interface line. The virtual ANs included in the switches 61a through 61d are respectively connected to the City-Wide centrex station 62 via the V5.2 interfaces.

A subscriber who is to receive the City-Wide centrex service is accommodated by each of the virtual ANs using the semi-permanent accommodating method. Assuming that a certain subscriber accommodated by the switch 61a is made to belong to a City-Wide centrex group, the subscriber is accommodated by the virtual AN of the switch 61a. To accommodate the subscriber in the virtual AN, it is sufficient to change the setting of the subscriber data memory (refer to FIGS. 14A and 14B) arranged for the switch 61a.

The City-Wide centrex station 62 manages a plurality of City-Wide centrex groups, and provides its service to each of the plurality of groups. Namely, the City-Wide centrex station 62 recognizes the user port ID of a virtual AN subscriber belonging to each of the groups, and manages each of the groups using the user port ID.

For the communication between virtual AN subscribers belonging to the City-Wide centrex groups, the switches 61a through 61d serve as V5.2 ANs, while the City-Wide centrex station 62 serves as a V5.2 LE. Accordingly, the City-Wide centrex station 62 can process a call related to a virtual AN subscriber as an internal office call related to a subscriber accommodated by the station itself. That is, if subscribers are respectively accommodated by virtual ANs although they are physically accommodated in different switches (such as the switches 61a and 61c), a call is processed internally in the City-Wide centrex station 62 for the communication made between the subscribers. As a result, the City-Wide centrex service can be provided by using the normal internal office call process capability of the centrex service without using a particular inter-office signal communication or without requiring an SCP (Service Control Point) of an intelligent network in the communication between virtual AN subscribers.

Additionally, since a call related to the centrex service is controlled by a single switching center (the City-Wide centrex station 62), it becomes possible to transparently provide the centrex service to centrex members (virtual AN subscribers) who are physically accommodated by different switches. Furthermore, a subscriber who is to enroll in the centrex service is accommodated not by arranging a remote concentrator dedicated to the centrex service or an AN device, but by using the virtual AN capability arranged in each switch. Therefore, subscribers accommodated by remote switches can be easily enrolled in the centrex group, and can be directly controlled as centrex members.

Figure 23:
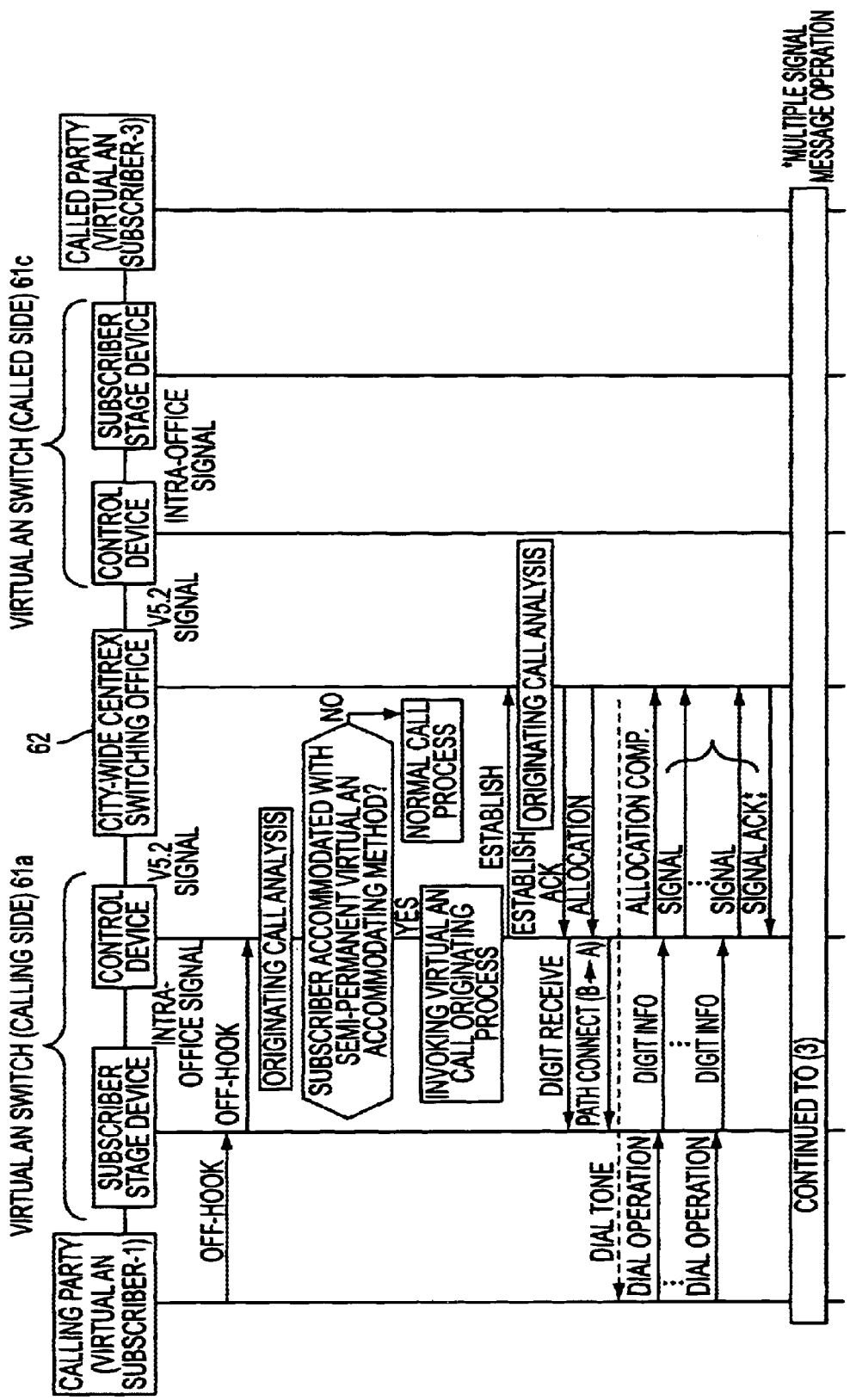
FIG. 23 shows a call process sequence when the City-Wide centrex service is provided by using the virtual AN capability (No.1)
Figure 24:
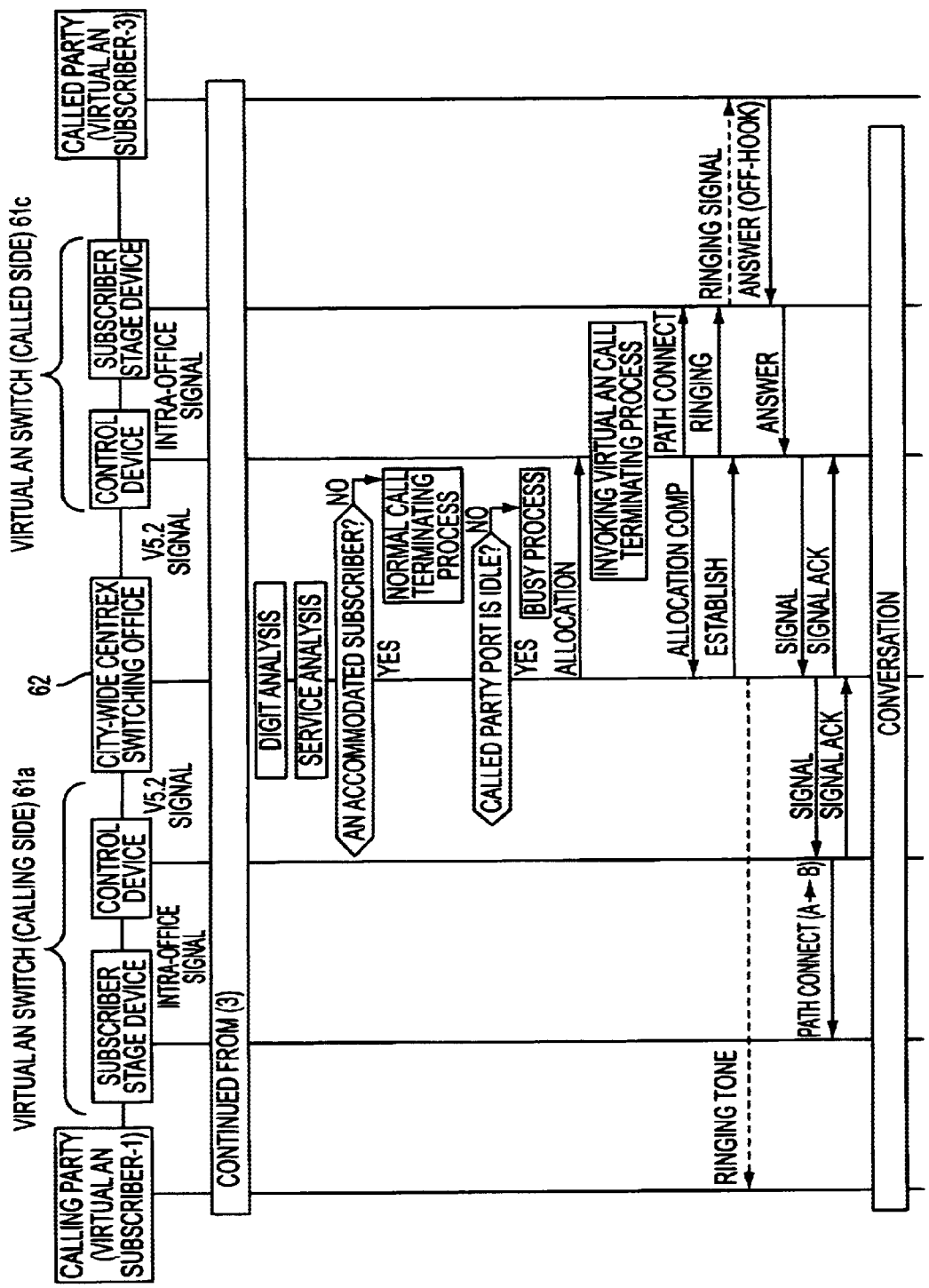
FIG. 24 shows a call process sequence when the City-Wide centrex service is provided by using the virtual AN capability (No.2)

FIGS. 23 and 24 show a call process sequence when the City-Wide centrex service is provided by using the virtual AN capability. Provided here is the explanation about the example in which the subscriber 1 accommodated by the switch 61a shown in FIG. 22 originates a call to the subscriber 3 accommodated in the switch 61c.

The processes performed by the switch 61a and the City-Wide centrex station 62 when the subscriber 1 performs an off-hook operation and enters the number indicating the subscriber 3 are respectively and fundamentally the same as those performed by the virtual AN switch 11 and the control switch 12, which are shown in FIGS. 17 and 18. The subscriber 1, however, dials the extension number of the subscriber 3.

The City-Wide centrex station 62 recognizes that the subscriber 1 is a virtual AN subscriber, and to which centrex group the subscriber 1 belongs, according to the user port ID of the subscriber 1, which is included in the ESTABLISH message. The City-Wide centrex station 62 recognizes the correspondence between an extension number used in each centrex group and the user port ID of the subscriber, which corresponds to each extension number, in advance, and detects the user port ID of the subscriber 3 according to the extension number of the subscriber 3, which is received as the destination number.

The processes performed by the City-Wide centrex station 62 and the switch 61c when the subscriber 3 terminates the call are respectively and fundamentally the same as those performed by the control switch 12 and the virtual AN switch 11, which are shown in FIGS. 19 and 20. Note that the above described user port ID of the subscriber 3 is assigned to the V5.2 signal message transmitted/received between the City-Wide centrex station 62 and the switch 61c.

As described above, the City-Wide centrex station 62 provides the City-Wide centrex service by processing a call between virtual AN subscribers within the station itself.

Provided next is the explanation about the per-call-accommodating method which is one of the methods for accommodating a subscriber in a virtual AN. When a certain subscriber is accommodated by a virtual AN with the per-call-accommodating method, the virtual AN accommodation identifying information of the subscriber data of that subscriber is set to "2". The switch accommodating the subscriber accommodated by the virtual AN using the per-call-accommodating method determines whether or not it can provide a service requested in a communication related to the subscriber, for each call. If "YES", the switch itself performs a call process without using a virtual AN interface. If "NO", the switch invokes another switch which can provide the requested service by using the virtual AN interface.

Figure 25:
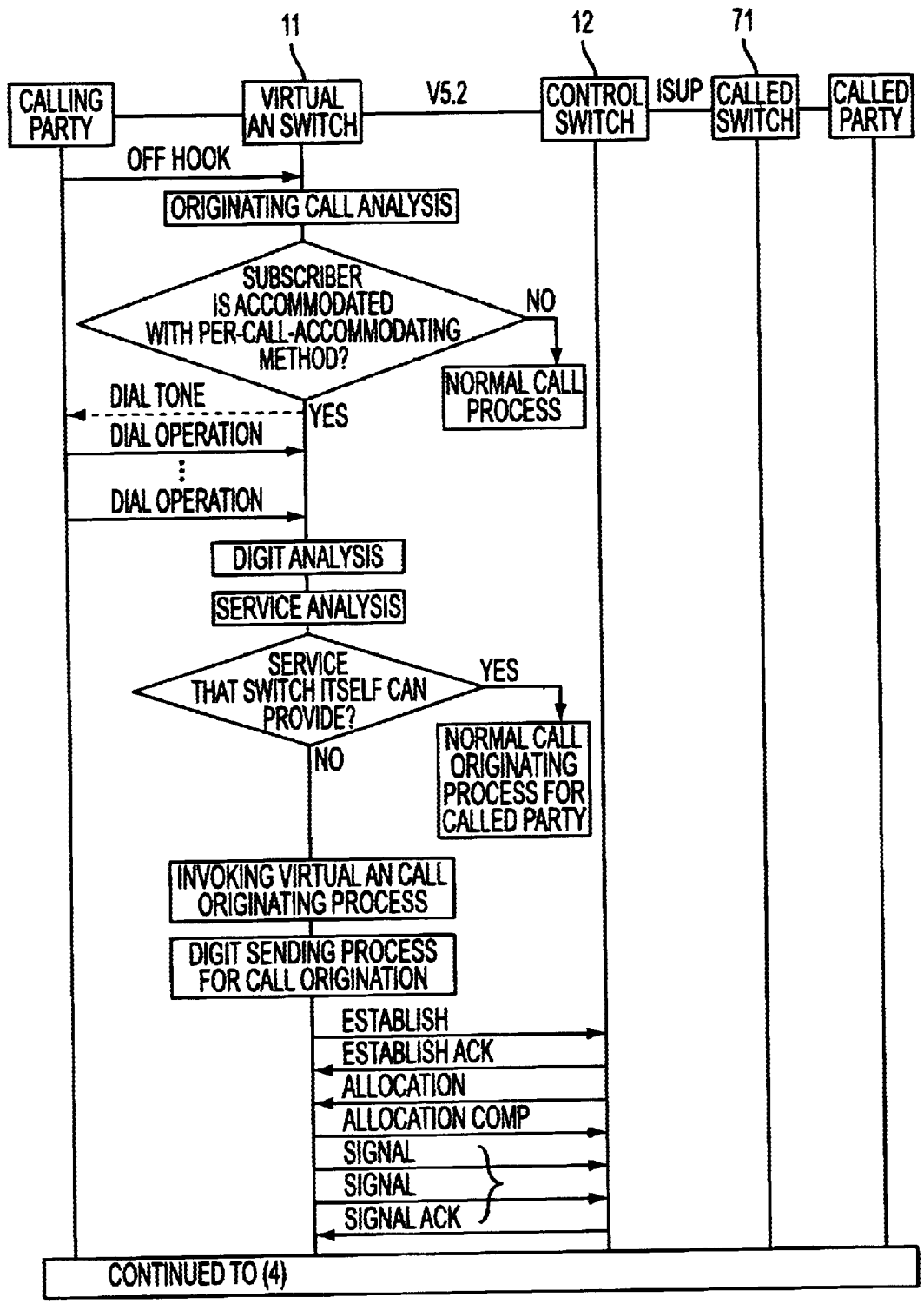
FIG. 25 shows a call process sequence when a subscriber accommodated with a per-call-accommodating method originates a call (No.1)
Figure 26:
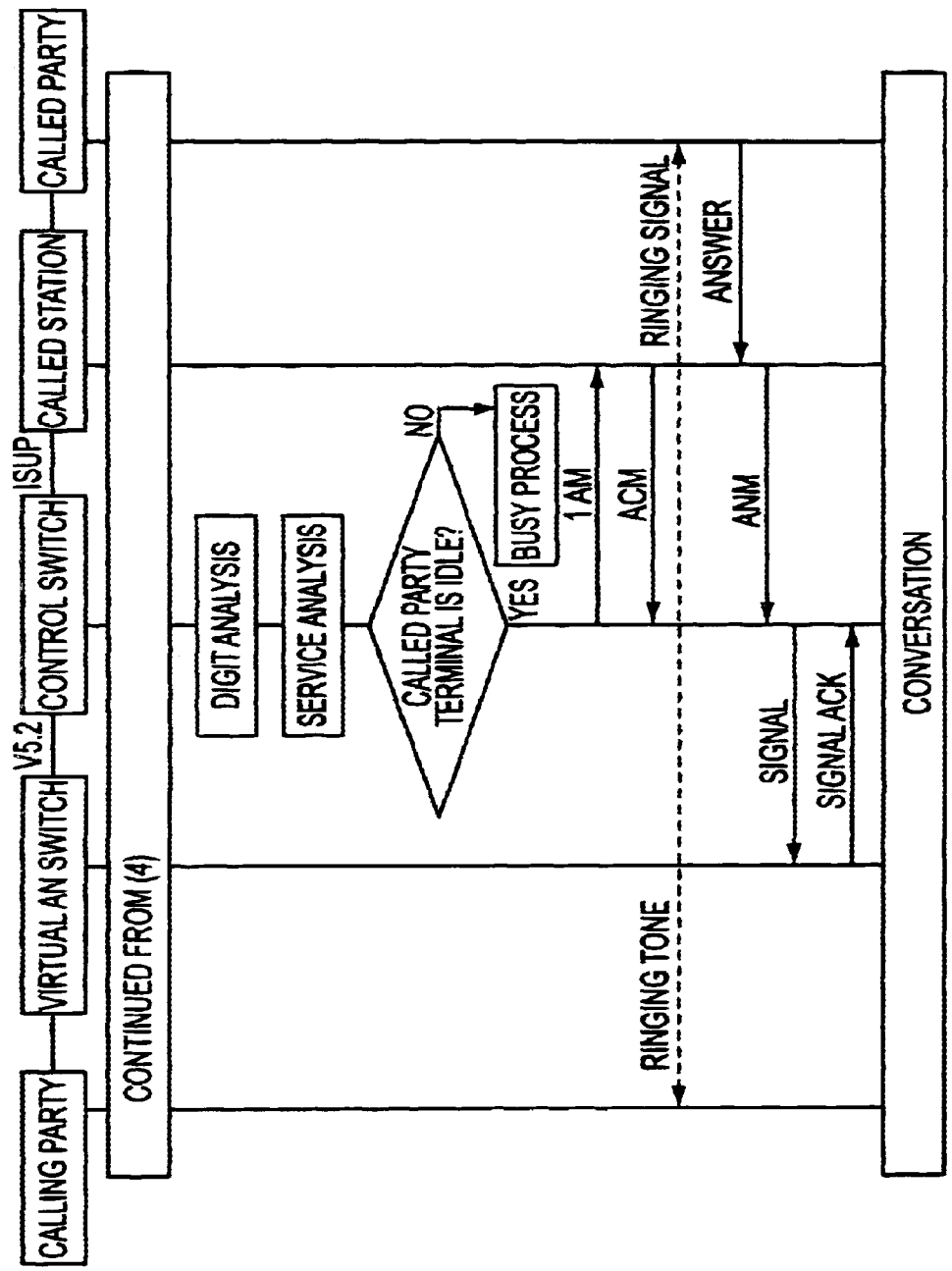
FIG. 26 shows a call process sequence when the subscriber accommodated with the per-call-accommodating method originates a call (No.2)

FIGS. 25 and 26 show a call process sequence when a subscriber accommodated by a virtual AN using the per-call-accommodating method originates a call. Here, the subscriber accommodated by the virtual AN switch 11 is assumed to be accommodated by the virtual AN using the per-call-accommodating method. The called party is assumed to be accommodated by a called station (switch) 71. Because the messages between the subscriber stage device 21 and the control device 41 in the virtual AN switch 11 are exchanged as shown in FIGS. 17 and 18, the illustration and the explanation are omitted here.

With the per-call-accommodating method, a subscriber belongs to both the virtual AN switch 11 and the control switch 12 in a pseudo manner. That is, the subscriber is registered to the virtual AN switch 11 as a per-call-accommodation virtual AN subscriber, while the subscriber is registered to the control switch 12 as a subscriber accommodated by a normal AN. The V5.2 signal link between the virtual AN switch 11 and the control switch 12 is established beforehand, and the control switch 12 is in the state in which it can accept a call from the virtual AN subscriber accommodated by the virtual AN switch 11 at any time.

On detecting a call-originating off-hook signal from the subscriber, the virtual AN switch 11 analyzes the call origination, determines whether or not the subscriber who outputs the off-hook signal is accommodated by a virtual AN, and examines its accommodating method if the subscriber is accommodated by the virtual AN. Namely, the subscriber data memory 24 (refer to FIG. 14A) is searched by using the subscriber accommodation position information of the calling party in the virtual AN switch 11, and the virtual AN accommodation identifying information is examined. If the virtual AN switch 11 determines that the calling party is a per-call-accommodated subscriber with this call origination analysis, it transmits a dial tone to the calling party. Then, the virtual AN switch 11 enters into the state in which it accepts the dial operation of the calling party. For the above described semi-permanent accommodated virtual AN subscriber, the control switch 12 performs the dial reception process. With the per-call accommodating method, however, the virtual AN switch 11 receives and analyzes the dial signal from the subscriber.

The virtual AN switch 11 performs a digit analysis process and a service analysis process (process for analyzing a requested service) based on the received dialed digits. An existing switch has the capabilities for performing these two processes.

If the virtual AN switch 11 can provide the requested service, it performs the call process and provides the service in a similar manner as in a normal switch. If the virtual AN switch 11 cannot provide the requested service, it invokes the virtual AN call origination process, and requests the control switch 12 to provide the service.

The virtual AN switch 11 converts the dialed digits received from the subscriber into V5.2 signal messages, and transmits them to the control switch 12, in order to request the control switch 12 to implement the service. The V5.2 signal messages transmitted/received between the virtual AN switch 11 and the control switch 12 are the same as those explained by referring to FIGS. 17 and 18. Accordingly, for the control switch 12, the call origination from the subscriber is equivalent to that from a subscriber accommodated by a normal AN connected to the control switch 12.

The control switch 12 provides the requested service by referencing the dialed digits transferred from the virtual AN switch 11 as the SIGNAL messages, the subscriber data etc.

Assume that a call barring service for restricting call origination to a specific pre-registered destination is requested. Also assume that the virtual AN switch 11 cannot provide this service, and the control switch 12 can provide the service. In this case, the control switch 12 determines whether or not the number received from the virtual AN switch 11 belongs to an allowed destination, and establishes a call according to a normal inter-office signal sequence (ISUP) between the called station and the control switch 12 itself only if the called destination is allowed.

Figure 27:
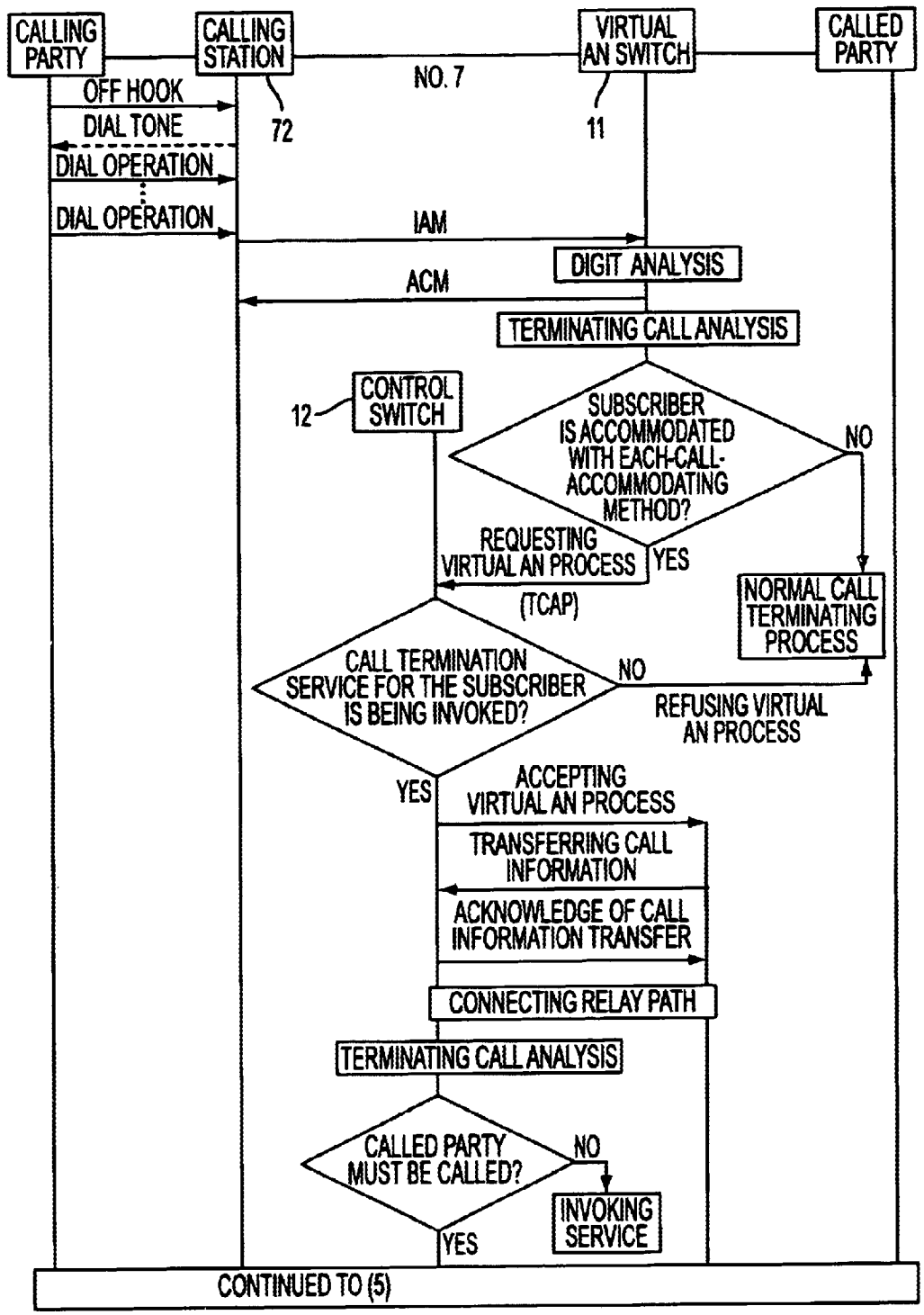
FIG. 27 shows a call process sequence when the subscriber accommodated with the per-call-accommodating method terminates a call (No.1)
Figure 28:
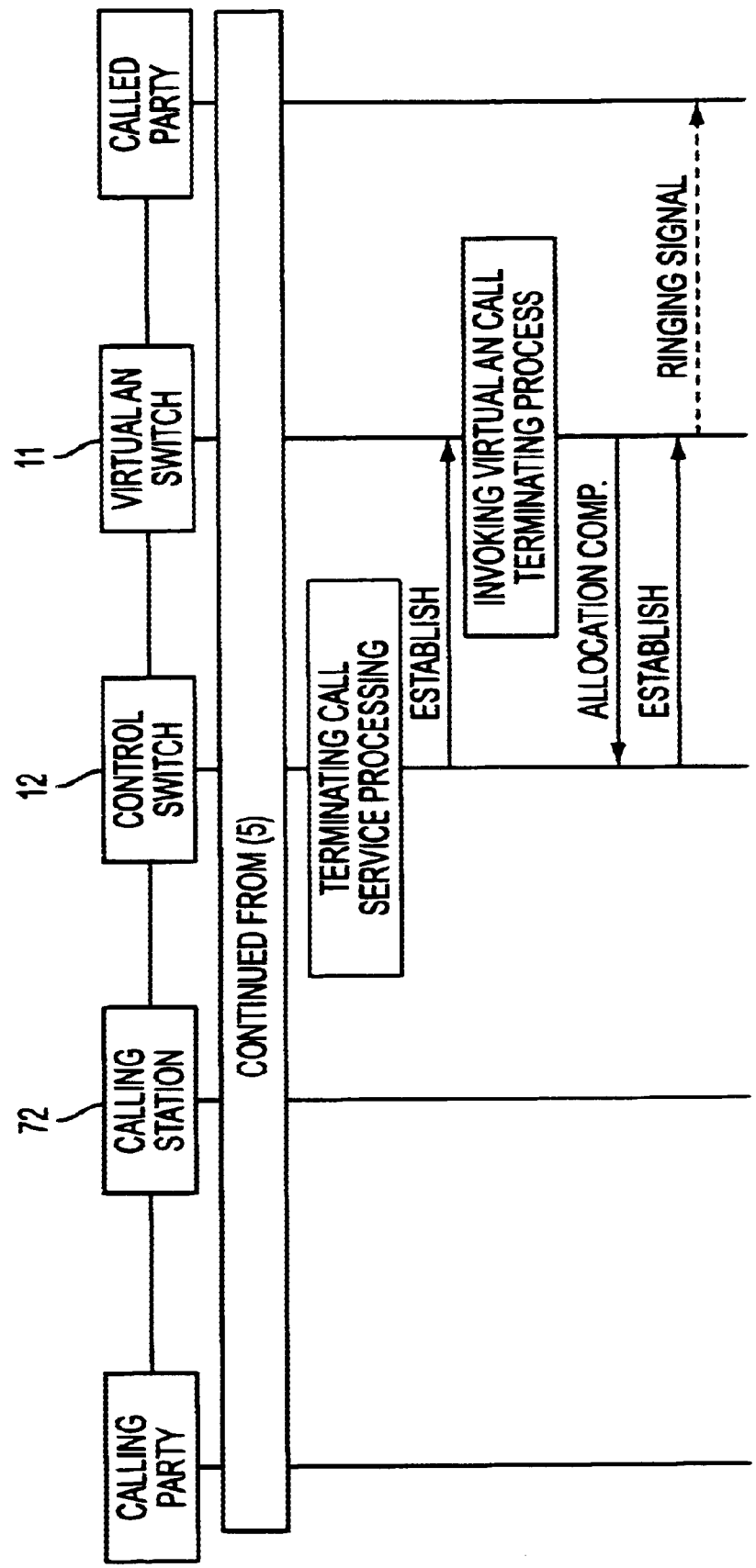
FIG. 28 shows a call process sequence when the subscriber accommodated with the per-call-accommodating method terminates a call (No.2)

FIGS. 27 and 28 show a call process sequence when a subscriber accommodated by a virtual AN with the per-call-accommodating method terminates a call. Provided here is the explanation about the sequence for terminating a call at the subscriber accommodated by the virtual AN switch 11 with the per-call-accommodating method. Assume that the virtual AN subscriber at the destination enrolls in a call transfer service as an additional service and the destination information for call transfer is registered to the control switch 12. Also assume that the virtual AN switch 11 cannot provide the call transfer service, and the control switch 12 can implement this service. Since messages between the subscriber stage device 21 in the virtual AN switch 11 and the control device 41 are exchanged as shown in FIGS. 19 and 20, their illustration and explanation are omitted here.

When a calling party dials the number of a called party, the call is routed from a calling station 72 accommodating the calling party to the virtual AN switch 11. That is, the calling station 72 notifies the virtual AN switch 11 of the number that the calling party input by transmitting an IAM message.

The virtual AN switch 11 performs a digit analysis process and a call termination process based on a call terminating signal (the IAM message according to the common channel signalling in this example). The virtual AN switch 11 determines whether or not the called party is accommodated in a virtual AN. That is, the virtual AN switch 11 searches the subscriber data memory 24 (refer to FIG. 14B) by using the telephone number of the called party as a key, and examines the virtual AN accommodation identifying information of the called party. If the called party is not a virtual AN subscriber, the virtual AN switch 11 performs a normal call process. However, since the virtual AN switch 11 cannot provide a call transfer service, this call is processed as a normal call.

When the terminated call using a V5.2 signal message is detected, the called party memory shown in FIG. 14B is searched by using the user port ID included in the message as a key. However, when a normal call is detected as shown in the example of FIG. 27, the subscriber data is referenced by using the search key generated based on the telephone number of the called party, etc. That is, the virtual AN switch 11 can reference the memory shown in FIG. 14B by using the search key generated based on the telephone number of the called party, etc. although this is not shown in the drawings.

When the virtual AN switch 11 recognizes that the called party as a per-call-accommodated subscriber, it inquires of the control switch 12 whether or not the call terminating process must be requested to the control switch 12 for each call. A TCAP message is used in this inquiry process.

On receiving the TCAP message, the control switch 12 determines whether or not the call terminating service to be provided to the called party is registered. If "NO", the control switch 12 notifies the virtual AN switch 11 that it refuses the virtual AN process request. In this case, the virtual AN switch 11 performs the normal call process. If the service to be provided to the called party is registered, "Yes", the control switch 12 notifies the virtual AN switch 11 that it accepts the virtual AN process. If the virtual AN process is accepted, the virtual AN switch 11 transfers call information to the control switch 12. With this call information transfer, called party information, etc. are notified. When the call information transfer is completed, a relay path is established between the virtual AN switch 11 and the control switch 12. In this way, the calling party is connected to the control switch 12 via the calling station 72 and the virtual AN switch 11. That call processing is then performed in the control switch 12.

Here, if the service registered for the called party is an "unconditional transfer (a service which unconditionally transfers a terminated call to another terminal whose number is pre-registered), the control switch 12 immediately performs the call process for calling the pre-registered number of the transfer destination. Or, if the registered service is a "no-answer-case transfer service (the service for calling a called party at one time, and transferring a terminated call to another terminal whose number is pre-registered when the called party does not answer)", the control switch 12 transfers the call terminating instruction for calling the called party accommodated in the virtual AN switch 11 by using a V5.2 signal message, as shown in FIG. 28. When the called party does not answer, the control switch 12 performs the call transfer service.

With the semi-permanent accommodating method, a service related to a certain virtual AN subscriber is not implemented in the switch accommodating the virtual AN subscriber, but is always implemented in another switch as described above. With the per-call-accommodating method, however, a service related to a virtual AN subscriber is basically implemented in the switch accommodating the virtual AN subscriber, and the service is alternatively implemented by another switch if it cannot be implemented by the accommodating switch. As described above, since whether or not the virtual AN capability is used is determined depending on a service with the per-call-accommodating method, both the number of times that the process for making a conversion between an intra-office signal and a V5.2 signal message, and the number of times that the process for transmitting/receiving a control signal between a virtual AN switch and a control switch are performed, can be reduced.

Provided next is the explanation about the configuration of a system for dynamically sharing a load on a switch by using a virtual AN. Generally, if a load is concentrated on one particular switch, the processor for controlling the call process of the switch enters into an overload state. The switch may restrict calls originated from the switch itself as occasion demands. With the load sharing method according to this embodiment, which will be described below, if a switch enters into the overload state, a particular subscriber among subscribers accommodated by the switch is made to be accommodated by another switch via a virtual AN, and the another switch is made to perform the call process, so that the call origination restriction of the switch is prevented.

Figure 29:
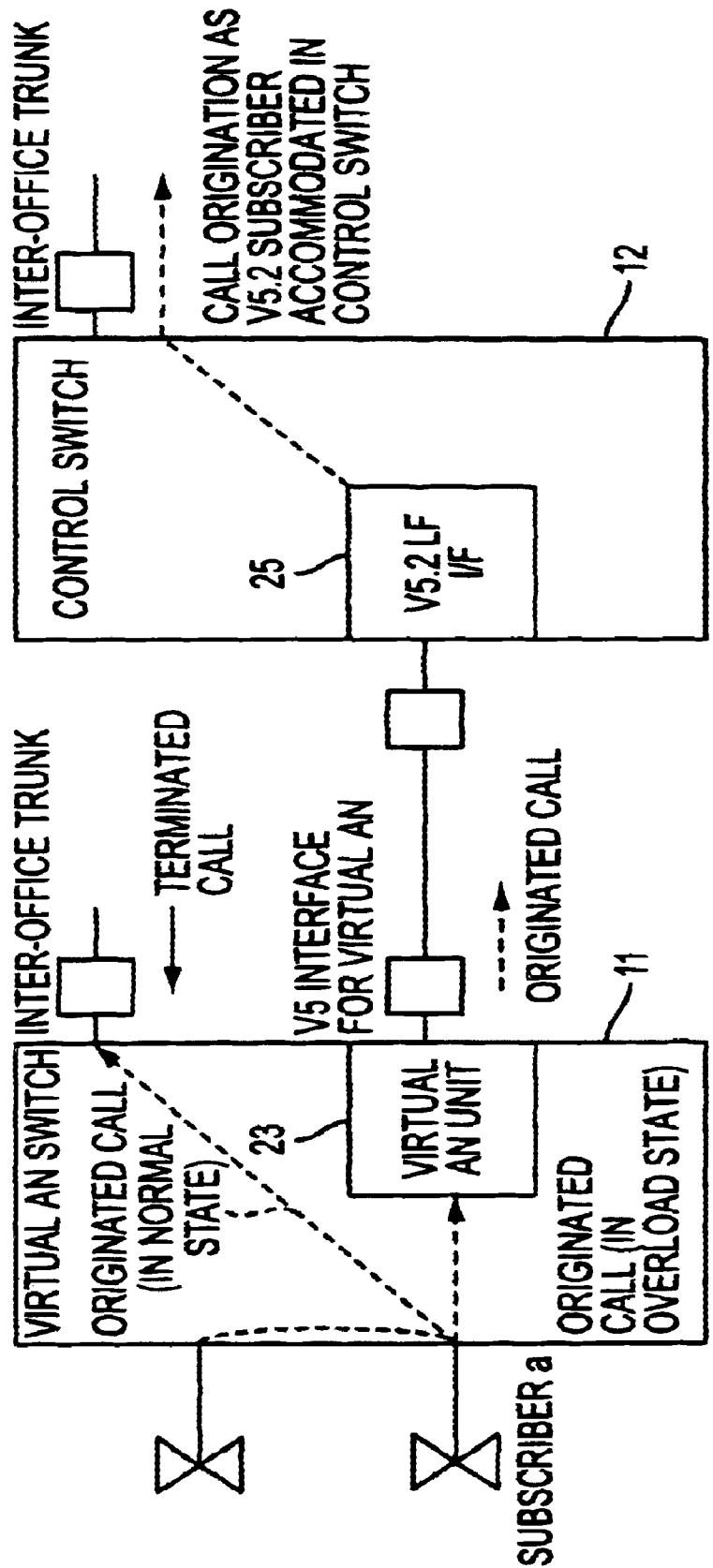
FIG. 29 is a schematic diagram explaining a method for dynamic load sharing by using a virtual AN.

FIG. 29 is a schematic diagram explaining the method for dynamic load sharing by using a virtual AN. Assume that the attribute of the virtual AN accommodation identifying information of a predetermined subscriber is set to "3: dynamic load sharing accommodation method" in the virtual AN switch 11. Here, the attribute of the virtual AN accommodation identifying information of a subscriber "a" is assumed to be set to "3". The virtual AN unit 23 arranged in the virtual AN switch 11 is connected to the control switch 12 via a V5.2 interface.

The virtual AN switch 11 handles the subscriber "a" as a normal subscriber without using the virtual AN unit 23 in a normal state. That is, when the subscriber "a" originates a call, the virtual AN switch 11 process the call (implements the service) within the switch itself. In this case, the virtual AN switch 11 uses its own resources such as an inter-office trunk circuit, etc. to be used for connecting to another switch, and transmits/receives a control signal with a common channel signalling.

When the load on the virtual AN switch 11 increases to a predetermined value or more, the subscriber whose attribute of the virtual AN accommodation identifying information is set to "the method for dynamic load sharing" (the subscriber "a" in this case) is accommodated in the virtual AN unit 23. If the subscriber "a" originates a call in this state, the virtual AN call originating process is invoked. Namely, the virtual AN unit 23 notifies the control switch 12 of the call originated from the subscriber "a" by using the V5.2 signal message. The control switch 12 provides the service (call process, etc.) according to the received V5.2 signal message. Because the control switch 12 can accept call origination from a virtual AN at any time if it continuously makes the V5.2 interface unit 25 operable, no particular operation change, etc. is required even if the operation of the virtual AN switch 11 is changed.

Even if the virtual AN switch 11 is in the overload state, a terminated call is routed via its inter-office trunk as usual. This is because the routing condition of the call is not changed even when the dynamic load sharing process is invoked.

By requesting another switch to perform the call originating process in the virtual AN switch 11 as described above, the number of processing tasks that are performed by the virtual AN switch 11 is reduced. Conventionally, if a switch enters into an overload state, the numbers of times that the processes are performed by that switch is reduced by restricting calls originated from the switch. With the switch according to this embodiment, however, the load on the switch can be reduced without restricting call origination. Namely, the possibility that the call origination restriction is reduced or eliminated for a subscriber, thereby obtaining high performance.

When the load on the virtual AN switch 11 is reduced to a predetermined level or lower, the above described load sharing process is automatically suspended, and control is returned to a normal call process. Accordingly, the virtual AN switch 11 handles the subscriber "a" as a normal subscriber.

Figure 30:
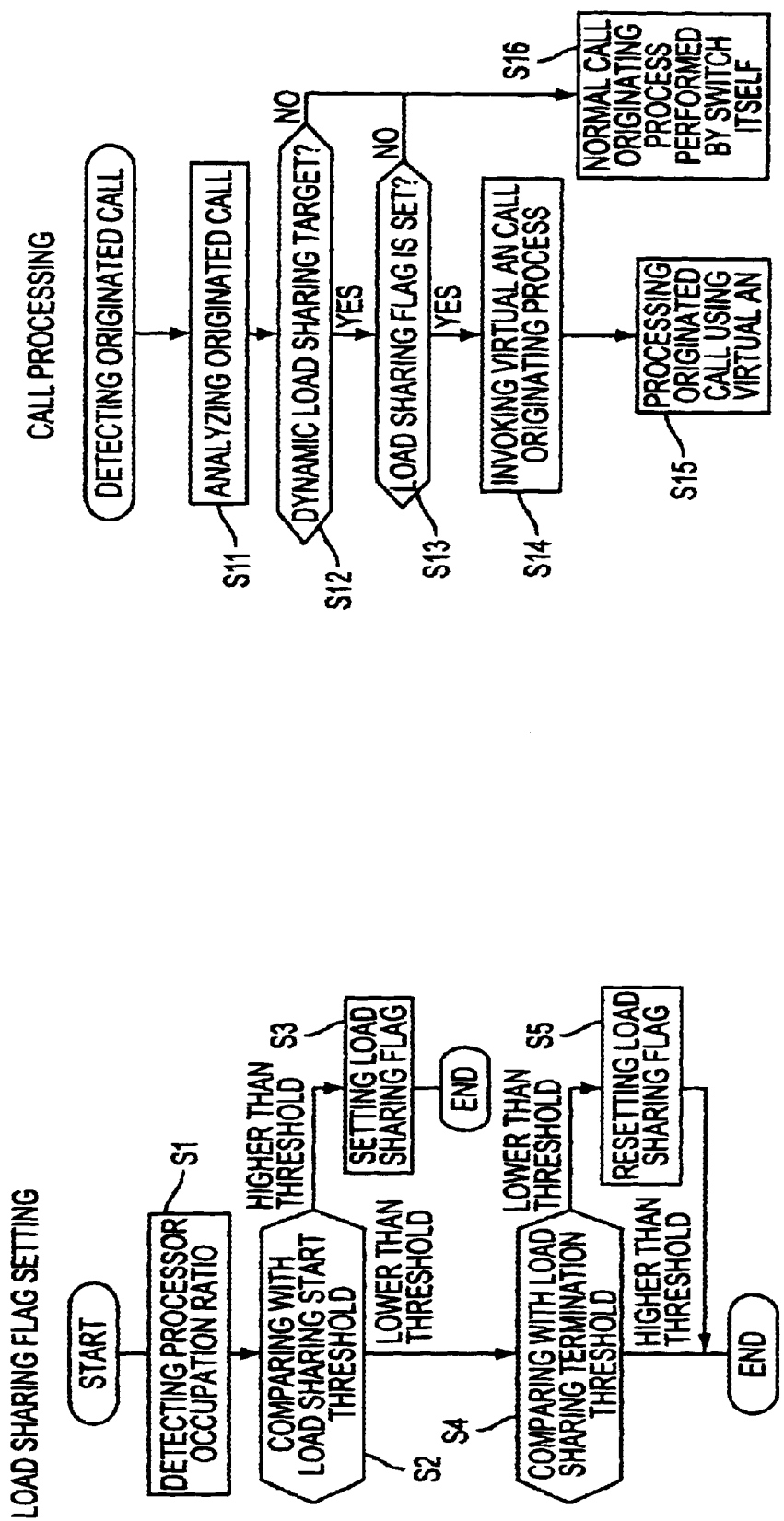
FIG. 30A is a flowchart showing a process for monitoring a load.
FIG. 30B is a flowchart showing a process performed by a virtual AN switch when a subscriber accommodated by the virtual AN switch originates a call.

FIG. 30A is a flowchart showing the process for monitoring a load. The virtual AN switch 11 monitors its own load state (the load state of the processor for controlling the operations of the virtual AN switch 11), and sets the result as a flag. In step S1, the virtual AN switch 11 detects the occupation ratio of the processor. In step S2, the virtual AN switch 11 makes a comparison between the occupation ratio detected in step S1 and a preset load sharing start threshold. If the detected processor occupation ratio is higher than the load sharing start threshold, the virtual AN switch 11 sets the load sharing flag in step S3.

If the detected processor occupation ratio is lower than the load sharing start threshold, the virtual AN switch 11 makes a comparison between the detected processor occupation ratio and a preset load sharing termination threshold. If the detected processor occupation ratio is lower than the load sharing termination threshold, the virtual AN switch 11 resets the load sharing flag in step S5. If the detected processor occupation ratio is higher than the load sharing termination threshold, the virtual AN switch 11 does not reset the load sharing flag, and the process ends.

The above described flowchart process is performed at predetermined time intervals using a timer interrupt, etc. The load sharing start threshold is a value larger than the load sharing termination threshold.

FIG. 30B is a flowchart explaining the process of the virtual AN switch 11 when a subscriber accommodated by the virtual AN switch 11 originates a call. This flowchart represents the process after the call originated from the virtual AN switch 11 is detected.

In step S11, the virtual AN switch 11 identifies the subscriber who originated the call by analyzing the call origination. In step S12, the virtual AN switch 11 examines the subscriber data of the subscriber who originated the call (refer to FIG. 14A), and determines whether or not the subscriber is accommodated by a virtual AN with the dynamic load sharing method. If "YES", the virtual AN switch 11 checks the load sharing flag in step S13.

If the load sharing flag is set, the virtual AN switch 11 invokes a virtual AN call originating process in step S14. That is, it accommodates the subscriber in the virtual AN switch 11 then requests the control switch 12 to perform the call process by transmitting a V5.2 signal message via the virtual AN in step S15.

If the subscriber who originated the call is determined to be not accommodated by the virtual AN with the dynamic load sharing method ("NO" in step S12), or if the load sharing flag is reset ("NO" in step S13), the virtual AN switch 11 performs the normal call process within itself in step S16.

Figure 31:
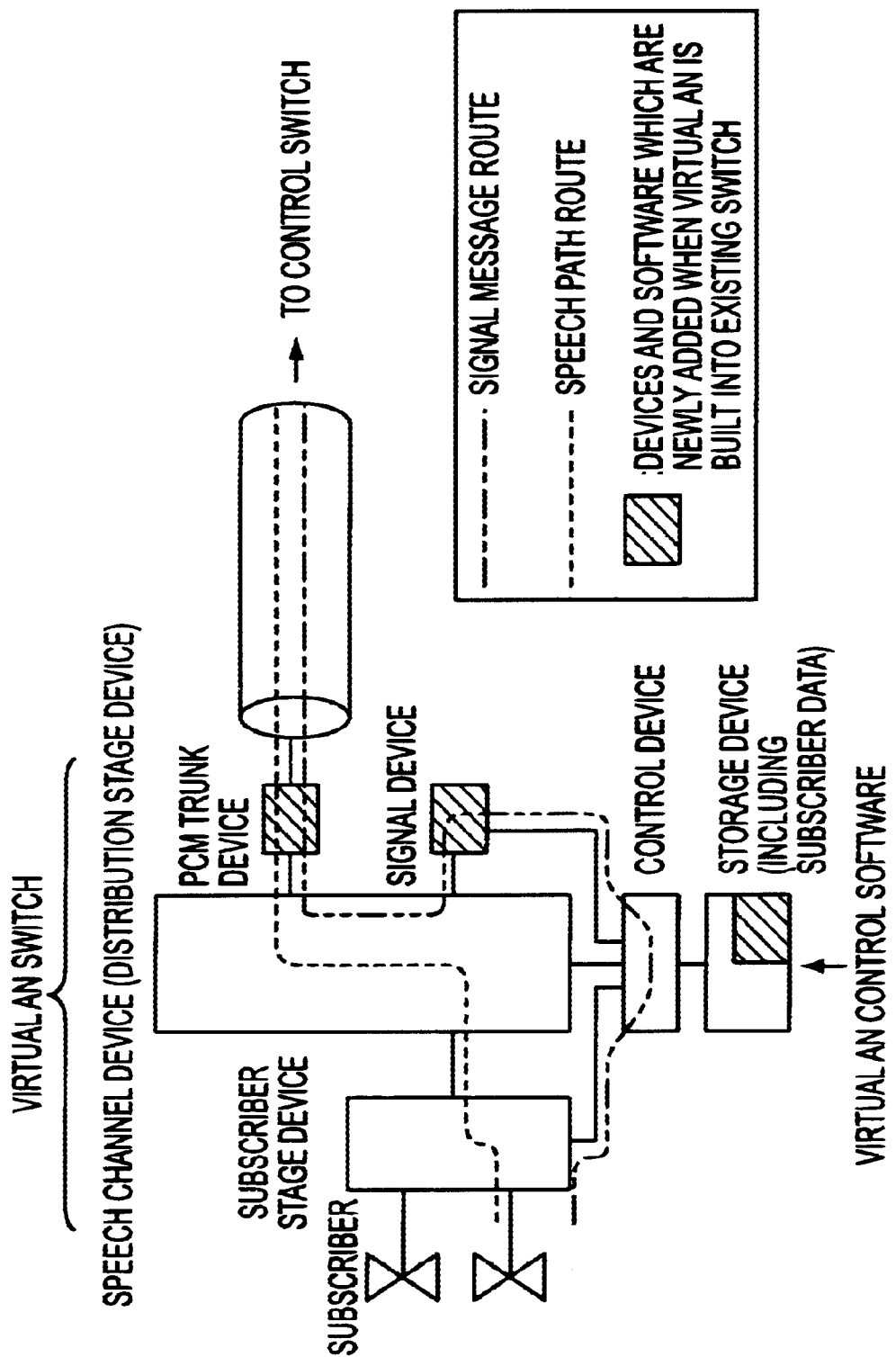
FIG. 31 is a schematic diagram explaining a method for embedding the virtual AN into an existing switch.

FIG. 31 is a schematic diagram explaining the method for building a virtual AN into an existing switch. The virtual AN is implemented by arranging a software program for implementing the virtual AN, the information set for each subscriber, which can be set as part of the subscriber data (refer to FIGS. 14A and 14B), a signalling device for controlling a V5.2 signal link, and a PCM trunk device for the virtual AN in the existing switch. That is, the virtual AN is implemented by controlling the switch resources such as the subscriber stage device, a speech path, a control device, a storing device, and additional devices etc, by software.

Figure 32:
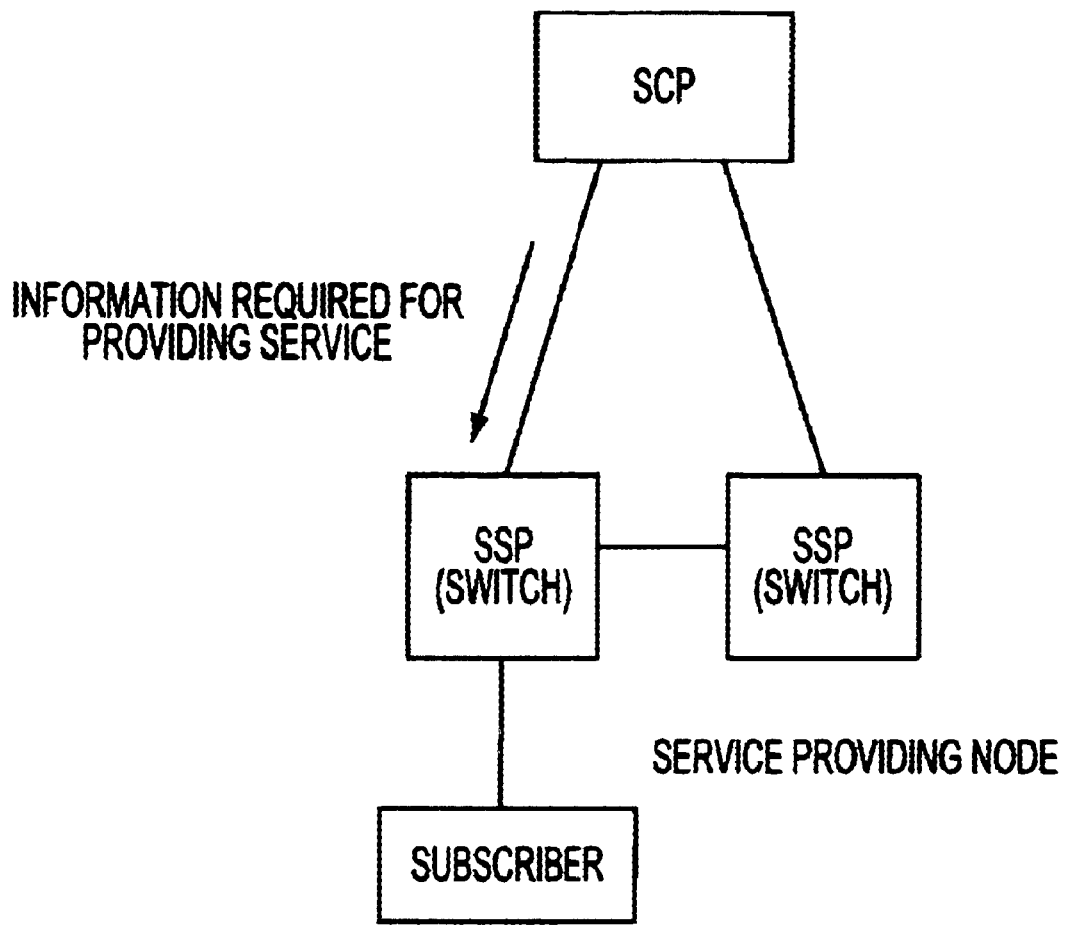
FIG. 32 is a block diagram explaining the typical configuration of an intelligent network.

An intelligent network (IN) is known as a system for providing various communications services. The switching system according to this embodiment, however, has the following differences from the IN. The IN is composed of SSPs (Service Switching Points) corresponding to switches, and an SCP (Service Control Point) for storing the information required for implementing services as shown in FIG. 32. Each of the SSPs receives the information required for a service when the service is implemented, and controls a call using the information. That is, an SSP accommodating a subscriber implements the service.

With the switching system according to this embodiment, if a subscriber accommodated by the virtual AN switch is accommodated by the control switch by using the virtual AN arranged in the virtual AN switch in a pseudo manner, the service requested by the communication related to the subscriber using the virtual AN is implemented in the control switch. That is, a service can be implemented in a switch other than a switch accommodating a subscriber with the switching system according to this embodiment.

According to this embodiment, the virtual AN switch and the control switch are connected according to the V5 protocols. The present invention, however, is not limited to this implementation. Another predetermined protocol may be used.

By using a virtual access network arranged in a switch, a subscriber accommodated by the switch can be virtually accommodated in another switch. Since whether or not each subscriber uses the virtual access network can be registered by using a software program at this time, the switch that substantially accommodates the subscriber can be changed without changing the connection of a subscriber line, etc.

Furthermore, because the implementation in which the above described virtual access network is used is offered depending on a service requested by a subscriber, a load state of the switch, etc., a flexible network can be realized.

What is claimed is:

1. A switch as a first switch arranged in a network where a plurality of switches including the first switch and a second switch are interconnected, comprising:

a virtual access network unit making the second switch perform a process of communication related to a subscriber accommodated by the first switch;

a storing unit storing attribute information which indicates whether or not the subscriber accommodated by the first switch uses said virtual access network unit;

a subscriber accommodating unit accommodating a calling party who is indicated as a virtual access network subscriber based on the attribute information stored in said storing unit among subscribers accommodated by the first switch in said virtual access network unit; wherein a plurality of virtual access network units are included, and the plurality of virtual access network units are respectively connected to different switches among the plurality of switches.

2. A process for accommodating a subscriber in a network where a plurality of switches, including a first switch and a second switch, are interconnected, comprising:

providing three methods for accommodating said subscriber in a virtual access unit, namely:

making the second switch implement all of services requested in a communication related to the subscriber accommodated by said virtual access network;

making the second switch provide a service which cannot be implemented by the first switch among the services requested in the communication related to the subscriber accommodated by said virtual access network unit; and making the second switch provide the services requested in the communication related to the communication related to the subscriber accommodated by said virtual access network unit when a predetermined condition is satisfied; and selecting one of the three methods and setting said selected method in a storing for each subscriber accommodated by said virtual access network.

3. The switch according to claim 1 or claim 2, further comprising:

a changing unit changing the attribute information stored in said storing unit for each of the subscribers.

4. The switch according to claim 1 or claim 2, further comprising:

a determining unit determining whether or not the subscriber is a subscriber using said virtual access network unit by accessing said storing unit, when a call originated by the subscriber accommodated by the first switch is detected; and an invoking unit invoking a virtual call originating process performed by said virtual access network unit if the subscriber is the subscriber using said virtual access network unit.

5. The switch according to claim 1 or claim 2, further comprising:

an invoking unit invoking a virtual call terminating process performed by said virtual access network unit when a call terminating message is received from the second switch via a predetermined interface between the second switch and said virtual access network unit.

6. The switch according to claim 1 or claim 2, wherein said virtual access network device comprises:

an interface unit establishing a connection to the second switch according to a V5 interface; and an allocating unit allocating resources required for a communication according to the V5 interface for the subscriber accommodated by said virtual access network.

7. The switch according to claim 1 or claim 2, further comprising:

a generating unit generating an intra-switch message based on a signal from the subscriber accommodated by the first switch; and a converting unit converting the intra-switch message into a message in a format stipulated by a predetermined interface between said virtual access network unit and the second switch.

8. The switch according to claim 1 or claim 2, wherein:

said storing unit stores information required when each of the subscribers is accommodated in said virtual access network unit, in correspondence with information for identifying a line of each of the subscribers accommodated by the first switch; and further comprising an accessing unit extracting information required when the subscriber is accommodated in said virtual access network unit from said storing unit based on the information for identifying the line of the subscriber, and accessing the second switch by using the information, when a call originated by the subscriber accommodated by the first switch is detected.

9. The switch according to claim 1 or claim 2, wherein said storing unit stores information for identifying a line of the subscriber accommodated by the first switch in correspondence with information for identifying the subscriber in a predetermined interface between said virtual access network unit and the second switch, further comprising:

an accessing unit extracting the information for identifying the line of the subscriber from said storing unit based on the information for identifying the subscriber in the predetermined interface, and accessing the subscriber at a destination by using the extracted information, when a call is terminated by the subscriber accommodated by the first switch.

10. The switch according to claim 1 or claim 2, further comprising:
- a service detecting unit detecting a service requested in a communication originated by the subscriber accommodated by the first switch;
- a determining unit determining whether or not the first switch can implement the service; and
- an activating unit activating said virtual access network device if the first switch cannot implement the service.

11. The switch according to claim 1 or claim 2, further comprising:
- a service detecting unit detecting a service requested in a communication terminated by the subscriber accommodated by the first switch;
- a determining unit determining whether or not the first switch can implement the device; and
- an activating unit activating said virtual access network device if the first switch cannot implement the service.

12. The switch according to claim 1 or claim 2, further comprising:
- a detecting unit detecting a load state of the first switch and activating unit activating said virtual access network unit according to a result of the detection of said detecting.

13. The switch according to claim 12, wherein:
said detecting unit periodically detects an occupation ratio of a processor controlling a call process in the first switch.

14. The switch according to claim 12, wherein:
said activating unit determines whether or not to activate said virtual access network unit according to the attribute information of the subscriber, which is stored in said storing unit, and the result of the detection of said detecting unit, for each call originated by the subscriber accommodated by the first switch.

* * * * *